US 8,064,192 B2
United States Patent
Kuranuki et al.

(10) Patent No.: US 8,064,192 B2
(45) Date of Patent: Nov. 22, 2011

(54) SOLID ELECTROLYTIC CAPACITOR

(75) Inventors: Kenji Kuranuki, Kyoto (JP); Katsuyuki Nakamura, Osaka (JP); Mikio Kobashi, Osaka (JP)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 12/663,378

(22) PCT Filed: Aug. 28, 2008

(86) PCT No.: PCT/JP2008/002328
§ 371 (c)(1),
(2), (4) Date: Dec. 7, 2009

(87) PCT Pub. No.: WO2009/028183
PCT Pub. Date: Mar. 5, 2009

(65) Prior Publication Data
US 2010/0165547 A1 Jul. 1, 2010

(30) Foreign Application Priority Data

Aug. 29, 2007 (JP) ................. 2007-222404
Sep. 19, 2007 (JP) ................. 2007-241876
Sep. 19, 2007 (JP) ................. 2007-241877
Sep. 19, 2007 (JP) ................. 2007-241878

(51) Int. Cl.
*H01G 9/00* (2006.01)
(52) U.S. Cl. ........ 361/525; 361/312; 361/523; 361/313; 361/502; 361/516
(58) Field of Classification Search ................. 361/312, 361/502, 523, 313, 516, 519, 528
See application file for complete search history.

(56) References Cited

U.S. PATENT DOCUMENTS

| 6,400,556 | B1 * | 6/2002 | Masuda et al. ............... 361/523 |
| 6,909,596 | B2 * | 6/2005 | Shimoyama et al. .......... 361/523 |
| 7,706,132 | B2 * | 4/2010 | Kawahito et al. ............. 361/523 |
| 7,916,456 | B2 * | 3/2011 | Mori et al. .................... 361/532 |

(Continued)

FOREIGN PATENT DOCUMENTS

| JP | 2003-289023 A | 10/2003 |
| JP | 2004-253615 A | 9/2004 |
| JP | 2005-026257 A | 1/2005 |

(Continued)

OTHER PUBLICATIONS

International Search Report for PCT/JP2008/002328.

*Primary Examiner* — Nguyen Ha
*Assistant Examiner* — Hung Dang
(74) *Attorney, Agent, or Firm* — Pearne & Gordon LLP

(57) ABSTRACT

A capacitor element includes a positive electrode body made of valve metal, a dielectric oxide layer on the positive electrode body, a solid electrolytic layer made of conductive polymer on the dielectric oxide layer, and a negative electrode layer on the solid electrolytic layer. A solid electrolytic capacitor includes the capacitor element, a package made of insulating resin covering the capacitor element, a base electrode provided at an edge surface of the package and made of non-valve metal coupled with the positive electrode body, a diffusion layer for connecting the positive electrode body to the base electrode, an external electrode on the base electrode, and an external electrode connected to the negative electrode layer. The solid electrolytic capacitor reduces the number of components and processes to reduce its cost and to have a small size, and has a small equivalent series resistance and a small equivalent series inductance.

16 Claims, 23 Drawing Sheets

U.S. PATENT DOCUMENTS

| | | | |
|---|---|---|---|
| 7,940,515 B2 * | 5/2011 | Ozawa | 361/523 |
| 2004/0165338 A1 | 8/2004 | Arai et al. | |
| 2004/0264111 A1 * | 12/2004 | Shimoyama et al. | 361/523 |
| 2005/0047060 A1 | 3/2005 | Arai et al. | |

FOREIGN PATENT DOCUMENTS

| | | |
|---|---|---|
| JP | 2005-045007 A | 2/2005 |
| JP | 2005-079463 A | 3/2005 |
| JP | 2005-085779 A | 3/2005 |

* cited by examiner

Fig. 4

| | Collision Seed (m/s) | Capacitance (μF) | ESR (mΩ) | ESL (nH) | Leakage Current (μA) |
|---|---|---|---|---|---|
| Example 1 | 150 | 47.0 | 50 | 0.8 | 0.5 |
| Example 2 | 200 | 47.3 | 15 | 0.8 | 0.8 |
| Example 3 | 250 | 47.2 | 10 | 0.8 | 0.9 |
| Example 4 | 300 | 46.5 | 8 | 0.8 | 1.3 |
| Example 5 | 350 | 47.1 | 10 | 0.8 | 5.0 |
| Example 6 | 400 | 47.0 | 10 | 0.8 | 1050 |
| Comparative Example 1 | N/A | 0.05 | 10000 | 0.8 | 0.1 |
| Comparative Example 2 | N/A | 47.0 | 20 | 1.5 | 0.8 |

Fig. 10

| | Collision Speed (m/s) | Capacitance (μF) | ESR (mΩ) | ESL (nH) | Leakage Current (μA) |
|---|---|---|---|---|---|
| Example 7 | 150 | 122 | 35 | 0.05 | 0.3 |
| Example 8 | 200 | 121 | 13 | 0.05 | 0.8 |
| Example 9 | 250 | 123 | 10 | 0.05 | 0.9 |
| Example 10 | 300 | 120 | 7 | 0.05 | 1.5 |
| Example 11 | 350 | 122 | 8 | 0.05 | 3.2 |
| Example 12 | 400 | 120 | 10 | 0.05 | 580 |
| Comparative Example 3 | N/A | 0.05 | 10000 | 0.05 | 0.1 |
| Comparative Example 4 | N/A | 120 | 12 | 1.5 | 0.9 |

Fig. 15

| | Collision Speed (m/s) | Capacitance (μF) | ESR (mΩ) | ESL (nH) | Leakage Current (μA) |
|---|---|---|---|---|---|
| Example 13 | 150 | 221 | 15 | 0.2 | 0.8 |
| Example 14 | 200 | 223 | 5.2 | 0.2 | 0.7 |
| Example 15 | 250 | 221 | 6.0 | 0.2 | 1.0 |
| Example 16 | 300 | 223 | 4.8 | 0.2 | 1.5 |
| Example 17 | 350 | 222 | 3.5 | 0.2 | 2.8 |
| Example 18 | 400 | 220 | 3.2 | 0.2 | 500 |
| Comparative Example 5 | N/A | 0.03 | 10000 | 0.2 | 0.5 |
| Comparative Example 6 | N/A | 220 | 4.0 | 1.5 | 0.8 |

Fig. 20

| | Collision Speed (m/s) | Capacitance (µF) | ESR (mΩ) | ESL (nH) | Leakage Current (µA) |
|---|---|---|---|---|---|
| Example 19 | 150 | 103 | 180 | 0.9 | 0.05 |
| Example 20 | 200 | 102 | 50 | 0.9 | 0.06 |
| Example 21 | 250 | 106 | 55 | 0.9 | 0.10 |
| Example 22 | 300 | 103 | 40 | 0.9 | 0.50 |
| Example 23 | 350 | 102 | 35 | 0.9 | 2.00 |
| Example 24 | 400 | 103 | 30 | 0.9 | 1005 |
| Comparative Example 7 | N/A | 0.001 | 10000 | 0.9 | 0.03 |
| Comparative Example 8 | N/A | 105 | 53 | 1.5 | 0.05 |

SOLID ELECTROLYTIC CAPACITOR

TECHNICAL FIELD

The present invention relates to a solid electrolytic capacitor including solid electrolyte.

BACKGROUND ART

As electronic apparatuses operate at higher frequencies, capacitors used in the electronic apparatuses are required to have lower impedance at higher frequencies. To meet this requirement, solid electrolytic capacitors employing conductive polymer having higher conductivity has been developed.

Solid electrolytic capacitors to be used around CPUs of personal computers are required to have a large capacitance and a small size, and further, to have a small equivalent series resistance (ESR) at high frequencies as well as a low equivalent series inductance (ESL) for preferable noise reduction and transient response properties.

FIG. 21A is a sectional view of a conventional solid electrolytic capacitor disclosed in Patent Document 1. FIG. 21B is a sectional view of capacitor 501 at along line 21B-21B shown in FIG. 21A. Solid electrolytic capacitor 501 includes stacked plural capacitor elements 111 having a plate shape. Each capacitor element 111 includes positive electrode body 112 made of aluminum foil as valve metal foil, and a dielectric oxide layer provided on a surface of positive electrode body 112. The surface of positive electrode body 112 is roughened. Resist 113 having an insulating property is provided on the dielectric oxide layer, and separates positive electrode body 112 into positive electrode section 114 and a negative electrode deck. A solid electrolytic layer made of conductive polymer is provided on the dielectric oxide layer at the negative electrode deck. A negative electrode layer including a carbon layer and a silver paste layer is provided on the solid electrolytic layer, thus providing negative electrode section 115. In capacitor elements 111 having a plate shape, positive electrode sections 114 and negative electrode sections 115 are arranged along a longitudinal direction of the capacitor element.

Positive common terminal 116 is connected to positive electrode sections 114 of capacitor elements 111, and includes flat section 116A and connector section 116B that is formed by bending upward both sides of flat section 116A. Positive electrode sections 114 of stacked capacitor elements 111 are mounted to flat section 116A. Connector section 116B is bent to cover plural capacitor elements 111. A tip of connector section 116B is welded to positive electrode section 114 with laser beam.

Negative common terminal 117 is connected to negative electrode sections 115 of capacitor elements 111, and it has flat section 117A having negative electrode sections 115 mounted thereto. Flat section 117A and negative electrode section 115 are bonded together with conductive adhesive 118A. Negative electrode sections 115 of plural capacitor elements 111 are bonded together with conductive adhesive 118B.

Insulating package resin 119 covers capacitor elements 111 integrally such that a portion of positive common terminal 116 and a portion of negative common terminal 117 are exposed outside. The portion of positive common terminal 116 and the portion of negative common terminal 117 exposed outside are bent along package resin 119 to the bottom of package resin 119 as to form positive terminal section 116D and negative terminal section 117B, respectively, thus providing surface-mounting solid electrolytic capacitor 501.

The tip of connector section 116B of positive common terminal 116 and positive electrode section 114 of capacitor element 111 of solid electrolytic capacitor 501 are irradiated with a laser beam simultaneously, so that connector section 116B can be welded stably to positive electrode section 114.

Conventional solid electrolytic capacitor 501 thus requires positive common terminal 116 and negative common terminal 117 in order to cover stacked capacitor elements 111 with package resin 119, so that the number of components and the number of processes increase, hence increasing cost and preventing the capacitor from having a small size. Further, the distance between positive terminal 116D and negative terminal 117B as well as connected sections thereof prevents the capacitor having a small ESR and a small ESL.

FIG. 22 is a sectional view of another conventional chip solid electrolytic capacitor 502 disclosed in Patent Document 2. Positive lead-wire 412 made of tantalum wire is embedded in capacitor element 411 which is formed by press-molding powder of tantalum metal, i.e. valve metal, to have a cylindrical column shape with a press-mold die. Reinforcing section 411A having a conical shape protruding from the outer periphery of capacitor element 411 to positive lead-wire 412. The press-molded tantalum metal powder is sintered to be a porous positive electrode body, and then, is anodized, thereby providing a dielectric oxide layer on the surface of the positive electrode body. A solid electrolytic layer made of conductive polymer is formed on the dielectric oxide layer. Then, negative electrode layer 413 made of carbon and silver paint is formed on the surface of the solid electrolytic layer.

Positive lead-terminal 414 is welded to positive lead-wire 412. Negative lead-terminal 415 is connected to negative electrode layer 413 with conductive adhesive 416. Insulating package resin 417 covers capacitor element 411 such that a part of positive lead-terminal 414 and a part of negative lead-terminal 415 are exposed from an outer surface of the resin. Those parts exposed from the surface are bent along package resin 417 from the sides to the bottom of package resin 417 to form external terminals 414A and 415A, thus providing surface-mounting chip solid electrolytic capacitor 502.

Conventional chip solid electrolytic capacitor 502 includes reinforcing section 411A having conical shape and protruding from the outer periphery of capacitor element 411 to positive lead-wire 412. When the positive electrode body is produced by press-molding, tantalum metal powder tends to flow into reinforcing section 411A, and increase a density of the tantalum metal powder locally within reinforcing section 411A and at the vicinity thereof. This structure holds positive lead-wire 412 more steadily, and increases resistance of wire 412 against external load applied to wire 412. This structure prevents the dielectric oxide layer from cracking and breaking, and allows reliable chip solid electrolytic capacitor 502 to be steadily manufactured.

Conventional chip solid electrolytic capacitor 502 includes capacitor element 411 including positive lead-wire 412 connected with positive lead-terminal 414, and negative electrode layer 413 of element 411 connected with negative lead-terminal 415 to form external terminals 414A and 415A. This structure increases the number of components of capacitor 502 and the number of processes, hence increasing its cost and preventing the capacitor from having a small size. The lengths of external terminals 414A and 415A as well as connected sections of the terminals prevent eth capacitor form having small ESR and ESL.

Patent Document 1: JP2003-289023A
Patent Document 2: JP2005-085779A

SUMMARY OF INVENTION

A capacitor element includes a positive electrode body made of valve metal, a dielectric oxide layer on the positive electrode body, a solid electrolytic layer made of conductive polymer on the dielectric oxide layer, and a negative electrode layer on the solid electrolytic layer. A solid electrolytic capacitor includes the capacitor element, a package made of insulating resin covering the capacitor element, a base electrode provided at an edge surface of the package and made of non-valve metal coupled with the positive electrode body, a diffusion layer for connecting the positive electrode body to the base electrode, an external electrode on the base electrode, and an external electrode connected to the negative electrode layer.

The solid electrolytic capacitor reduces the number of components and processes to reduce its cost and to have a small size, and has a small equivalent series resistance and a small equivalent series inductance.

BRIEF DESCRIPTION OF DRAWINGS

FIG. 4 shows an evaluation result of the solid electrolytic capacitor in accordance with Embodiment 1.

FIG. 10 shows an evaluation result of the solid electrolytic capacitor in accordance with Embodiment 4.

FIG. 15 shows an evaluation result of the solid electrolytic capacitor in accordance with Embodiment 7.

FIG. 20 shows an evaluation result of the solid electrolytic capacitor in accordance with Embodiment 8.

REFERENCE NUMERALS

Figure 1A:
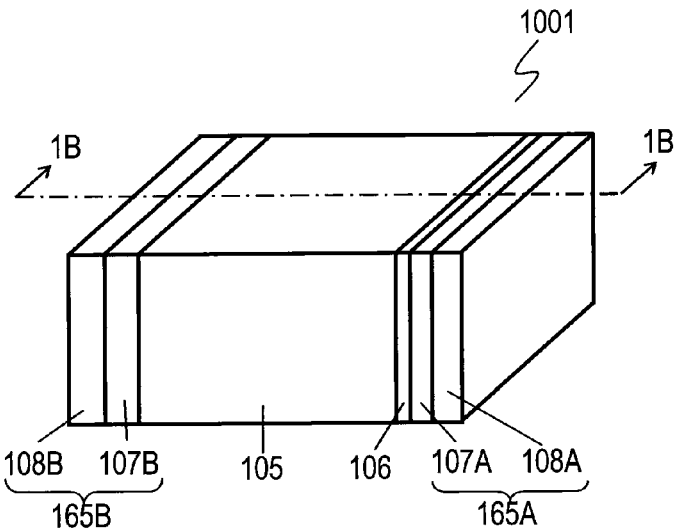
FIG. 1A shows a perspective view of a solid electrolytic capacitor in accordance with Exemplary Embodiment 1 of the present invention.

101 Capacitor Element (First Capacitor Element, Second Capacitor Element)
102 Positive Electrode Body (First Positive Electrode Body, Second Positive Electrode Body)
105 Package
105A Edge Surface (First Edge Surface)
105C Diffusion Layer (First Diffusion Layer)
106 Base Electrode (First Base Electrode)
107A Middle Electrode (First Middle Electrode)
107B Middle Electrode
108A Outer Electrode (First Outer Electrode)
108B Outer Electrode
110 Substrate
161 Dielectric Oxide Layer (First Dielectric Oxide Layer, Second Dielectric Oxide Layer)

163 Solid Electrolytic Layer (First Solid Electrolytic Layer, Second Solid Electrolytic Layer)
164 Negative Electrode Layer (First Negative Electrode Layer, Second Negative Electrode Layer)
165A External Electrode (First External Electrode)
165B External Electrode (Second External Electrode)
201 Capacitor Element (First Capacitor Element, Second Capacitor Element)
202 Positive Electrode Body (First Positive Electrode Body, Second Positive Electrode Body)
205 Negative Electrode Conductor (Second External Electrode)
206 Package
206A Edge Surface (First Edge Surface)
206B Edge Surface (Second Edge Surface)
206C Diffusion Layer (First Diffusion Layer)
206E Diffusion Layer (Second Diffusion Layer)
207A Base Electrode (First Base Electrode)
207B Base Electrode (Second Base Electrode)
208A Middle Electrode (First Middle Electrode)
209A Outer Electrode (First Outer Electrode)
210 Resin Layer
251 Dielectric Oxide Layer (First Dielectric Oxide Layer, Second Dielectric Oxide Layer)
253 Solid Electrolytic Layer (First Solid Electrolytic Layer, Second Solid Electrolytic Layer)
254 Negative Electrode Layer (First Negative Electrode Layer, Second Negative Electrode Layer)
255A External Electrode (First External Electrode)
255B External Electrode (Third External Electrode)
301 Capacitor Element (First Capacitor Element, Third Capacitor Element)
302 Positive Electrode Body (First Positive Electrode Body, Second Positive Electrode Body, Third Positive electrode Body)
305 Negative Electrode Conductor (Second External Electrode)
306 Package
306A Edge Surface (First Edge Surface)
306B Edge Surface (Second Edge Surface)
306C Diffusion Layer (First Diffusion Layer)
306E Diffusion Layer (Second Diffusion Layer)
307A Base Electrode (First Base Electrode)
307B Base Electrode (Second Base Electrode)
308A Middle Electrode (First Middle Electrode)
309A Outer Electrode (First Outer Electrode)
310 Spacer
351 Dielectric Oxide Layer (First Dielectric Oxide Layer, Second Dielectric Oxide Layer, Third Dielectric Layer)
353 Solid Electrolytic Layer (First Solid Electrolytic Layer, Second Solid Electrolytic Layer, Third Solid Electrolytic Layer)
354 Negative Electrode Layer (First Negative Electrode Layer, Second Negative Electrode Layer, Third Negative Electrode Layer)
355A External Electrode (First External Electrode)
355B External Electrode (Third External Electrode)
401 Capacitor Element (First Capacitor Element)
402 Positive Lead-Wire
405 Package
405A Edge Surface (First Edge Surface)
405C Diffusion Layer (First Diffusion Layer)
406 Base Electrode (First Base Electrode)
407A Middle Electrode (First Middle Electrode)
407B Middle Electrode
408A Outer Electrode (First Outer Electrode)
408b Outer Electrode
422 Metal Pellet
432 Positive Electrode Body (First Positive Electrode Body)
444 Negative Electrode Layer (First Negative Electrode Layer)
451 Dielectric Oxide Layer (First Dielectric Oxide Layer)
453 Solid Electrolytic Layer (First Solid Electrolytic Layer)
455A External Electrode (First External Electrode)
455B External Electrode (Second External Electrode)
1001A Stacked-Element Unit
2001A Stacked-Element Unit
3001A Stacked-Element Unit

DETAIL DESCRIPTION OF PREFERRED EMBODIMENTS

Exemplary Embodiment 1

Figure 1B:
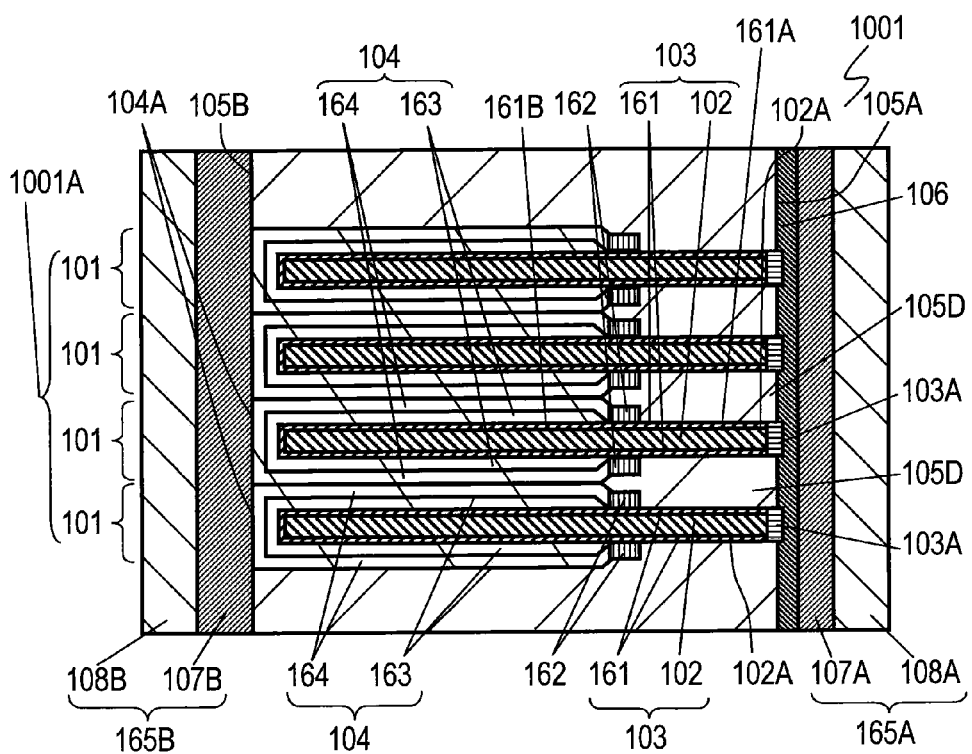
FIG. 1B shows a sectional view of the solid electrolytic capacitor on line 1B-1B shown in FIG. 1A.

FIG. 1A is a perspective view of solid electrolytic capacitor 1001 in accordance with exemplary Embodiment 1 of the present invention. FIG. 1B is a sectional view of solid electrolytic capacitor 1001 on line 1B-1B shown in FIG. 1A. Solid Electrolytic capacitor 1001 according to Embodiment 1 is a chip solid electrolytic capacitor.

Solid electrolytic capacitor 1001 includes plural capacitor elements 101 which are stacked. Each capacitor element 101 includes positive electrode section 103 and negative electrode section 104. Surface 102A of positive electrode body 102 made of valve metal, such as aluminum foil, having a thickness of 0.1 mm is roughened. Dielectric oxide layer 161 is formed on surface 102A of positive electrode body 102. Resist 162 having an insulating property is formed on layer 161. Resist 162 separates dielectric oxide layer 161 into positive electrode deck 161A and negative electrode deck 161B. Solid electrolytic layer 163 made of conductive polymer is formed on negative electrode deck 161B. Negative electrode layer 164 having a conductive property and including a carbon layer and a silver paste layer is formed on solid electrolytic layer 163. Solid electrolytic layer 163 and negative electrode layer 164 constitute negative electrode section 104. Capacitor element 101 has a plate shape having a length of 5.6 mm and a width of 3.4 mm. Positive electrode section 103 and negative electrode section 104 of respective capacitor element 101 are arranged along a longitudinal direction of the capacitor element.

Four capacitor elements 101 are stacked to form stacked-element unit 1001A. Package 105 made of insulating resin covers stacked-element unit 1001A. Positive electrode section 103 has edge surface 103A exposed from edge surface 105A of package 105. Negative section 104 has edge surface 104A exposed from edge surface 105B opposite to edge surface 105A of package 105. The number of capacitor elements 101 constituting stacked-element unit 1001A is not limited to four.

Base electrode 106 is made of zinc and connected to edge surface 103A of positive electrode section 103, and covers edge surface 105A of package 105.

Middle electrode 107B is connected to edge surface 104A of negative electrode section 104, and covers edge surface 105B of package 105. Middle electrode 107A is formed on base electrode 106. Middle electrodes 107A and 107B are made of conductive paste, such as silver paste.

Outer electrodes 108A and 108B are formed on middle electrodes 107A and 107B, respectively. Outer electrodes 108A and 108B are made of conductive material, such as solder, and are formed by, for example, plating molten solder. Middle electrode 107A and outer electrode 108A constitute external electrode 165A provided on base electrode 106.

Middle electrode 107B and outer electrode 108B are connected to edge surface 104A of negative electrode section 104, thus constituting external electrode 165B provided on edge surface 105B of package 105.

Figure 2A:
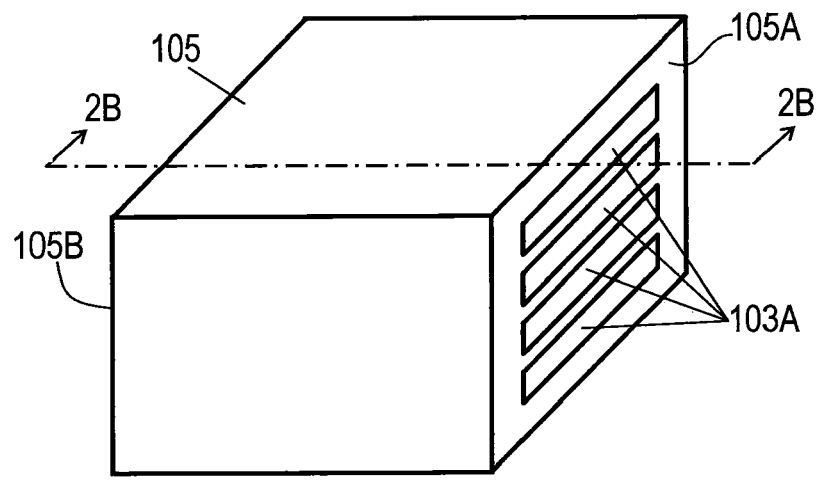
FIG. 2A is a perspective view of the solid electrolytic capacitor in accordance with Embodiment 1 for illustrating a method of manufacturing the capacitor.
Figure 2B:
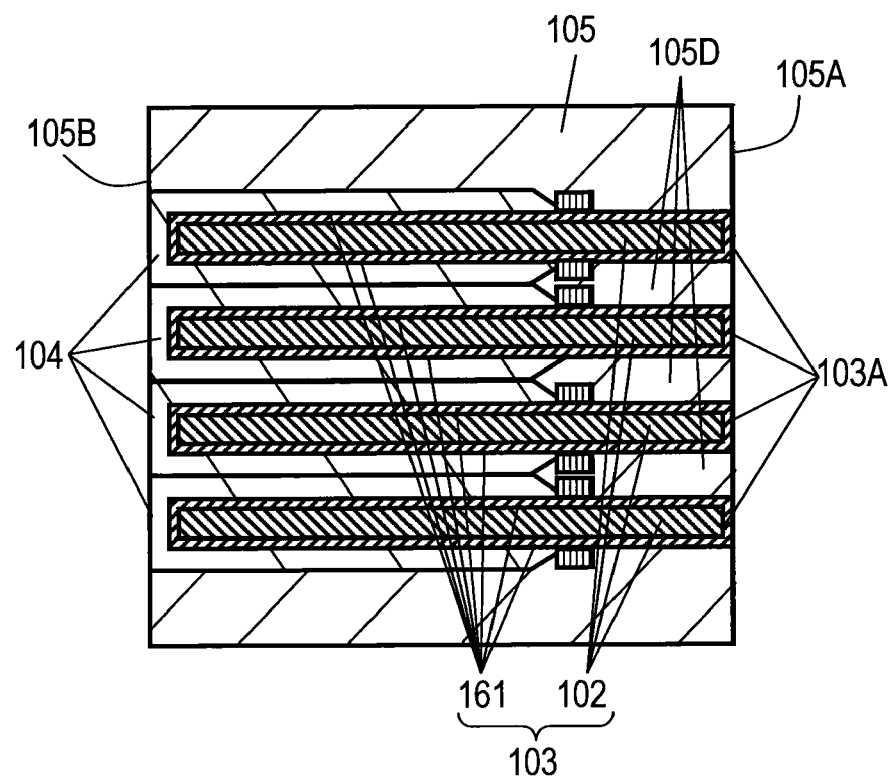
FIG. 2B is a sectional view of the solid electrolytic capacitor on line 2B-2B shown in FIG. 2A.

Next, a method for manufacturing chip solid electrolytic capacitor 1001 will be described below. FIG. 2A is a perspective view of package 105 covering stacked-element unit 1001A. FIG. 2B is a sectional view of package 105 on line 2B-2B shown in FIG. 2A. Package 105 includes portion 105D filling between positive electrode sections 103 of plural capacitor elements 101. Package 105 is made of insulating resin containing resin, such as epoxy resin, and 80% to 90% of inorganic filler, such as silica ($SiO_2$); however, the insulating resin of package 105 is not limited to this composition.

Figure 3A:
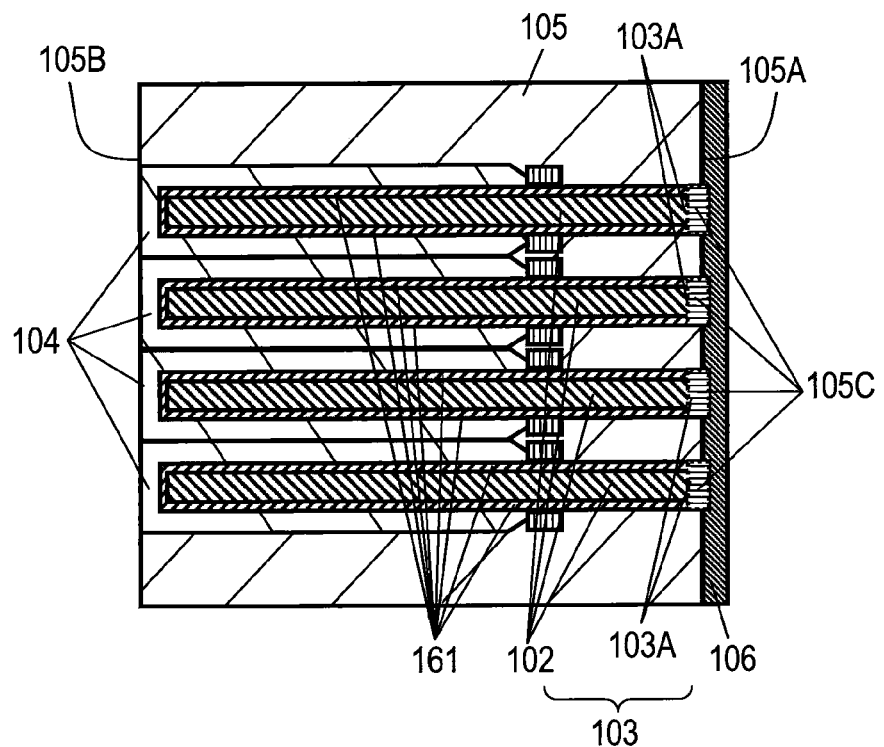
FIG. 3A is a sectional view of the solid electrolytic capacitor in accordance with Embodiment 1 for illustrating a method of manufacturing the capacitor.

FIG. 3A is a sectional view of package 105 having base electrode 106 formed thereon. Base electrode 106 is connected to edge surface 103A of positive electrode section 103 exposed from edge surface 105A of package 105, and covers edge surface 105A. Base electrode 106 is a metal layer formed by causing metal particles made of non-valve metal, such as zinc, to collide with edge surface 105A of package 105. The metal particles collide with edge surface 105A at a speed not smaller than 200 m/sec and not greater than the speed of sound. The metal particles colliding at such a high speed with edge surface 103A of positive electrode body 102 break dielectric oxide layer 161, and melt due to energy produced by plastic deformation at the collision. The melting metal particles are coupled strongly to positive electrode body 102 made of valve metal of positive electrode section 103 made of valve metal by metallic bonding. Base electrode 106 is preferably made of non-valve metal having a corrosion potential close to that of the valve metal of positive electrode body 102. Base electrode 106 in accordance with Embodiment 1 is made of zinc having a corrosion potential close to that of aluminum forming positive electrode body 102; however, base electrode 106 may be made of other metal, such as brass or copper. In the case that the valve metal of the material of positive electrode body 102 is tantalum, the metal particles of base electrode 106 are preferably made of non-valve metal, such as copper or nickel, having a corrosion potential close to that of tantalum.

Figure 3B:
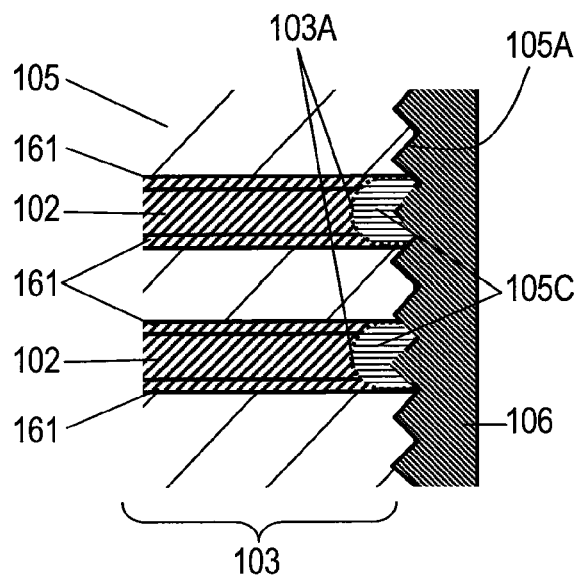
FIG. 3B is an enlarged view of the solid electrolytic capacitor shown in FIG. 3A.

FIG. 3B is an enlarged sectional view of package 105 shown in FIG. 3A. The metal particles melting due to the collision with positive electrode section 103 at the high speed form diffusion layer 105C between positive electrode body 102 and base electrode 106. The diffusion layer 105C is formed by coupling the valve metal forming positive electrode body 102 to the non-valve metal forming base electrode 106 by metallic bonding. A portion of base electrode 106 penetrates edge surface 105A of package 105, and is embedded in edge surface 105A, thereby providing an anchor effect to prevent base electrode 106 from being removed from edge surface 105A and to prevent base electrode 106 from being displaced particularly along edge surface 105A.

Base electrode 106 is coupled to positive electrode body 102 of positive electrode section 103 via diffusion layer 105C. In diffusion layer 105C, a portion of the non-valve metal forming base electrode 106 is replaced by a portion of the valve metal of positive electrode body 102 and is coupled with the non-valve metal by metallic bonding, thereby providing no boundary between base electrode 106 and positive electrode body 102. This structure extremely reduces an electric resistance between base electrode 106 and positive electrode body 102, and reduces an equivalent series resistance (ESR) of solid electrolytic capacitor 1001 accordingly.

Base electrode 106 is formed by the collision between the metal particles made of non-valve metal, such as zinc, and edge surface 105A of package 105. The metal particles collide with edge surface 105A at a speed not smaller than 200 m/sec and not greater than the speed of sound. Chip solid electrolytic capacitor 1001 includes positive electrode section 103 having edge surface 103A having a small area of about 0.3 $mm^2$. If base electrode 106 is formed by a cold-spray method causing the metal particles to collide with edge surface 105A at a speed higher than the speed of sound, the metal particles erode edge surface 103A of positive electrode section 103, and do not form diffusion layer 105C, hence preventing base electrode 106 from having a uniform thickness. On the other hand, the metal particles colliding at a speed lower than 200 m/sec form base electrode 106 on edge surface 105A or 103A; however, do not form diffusion layer 105C due to such a weak impact, hence preventing solid electrolytic capacitor 1001 from having a small ESR. The metal particles have an average particle diameter ranging preferably from 5 μm to 30 μm.

Edge surface 103A of positive electrode section 103 exposed from edge surface 105A of package 105 has a small area. Portions 105D of package 105 filling between positive electrode sections 103 of plural capacitor elements 101 protect edge surfaces 103A of capacitor elements 101, and allow edge surfaces 103 to be exposed from edge surface 105A of package 105. This structure allows positive electrode body 102 and the metal particles to form diffusion layer 105C, and allows base electrode 106 to have a uniform thickness.

Then, middle electrode 107B which is connected to edge surface 104B of negative electrode section 104 exposed from edge surface 105B of package 105 to cover edge surface 104B is formed. Middle electrode 107A is formed on base electrode 106. Both of middle electrodes 107A and 107B are made of conductive paste, such as silver paste, containing silver particles. Middle electrodes 107A and 107B can contain metal particles, such as copper-nickel alloy particles plated with silver or copper particles plated with silver, other than silver particles Then, outer electrodes 108A and 108B are formed on middle electrodes 107A and 107B by plating molten solder, respectively. Instead of the solder plating, outer electrodes 108A and 108B can be formed by ordinary plating, such as nickel plating.

In solid electrolytic capacitor 1001, base electrode 106 and outer electrodes 165A and 165B are formed on edge surfaces 103A and 104A of electrode sections 103 and negative electrode sections 104 stacked-element unit 1001A. This structure reduces the number of components and processes for assembly, and provides the capacitor with a small product cost and a small size. Further, this structure allows the electrodes are led out with a short length, accordingly reducing an equivalent series inductance (ESL) of the capacitor.

In solid electrolytic capacitor 1001 in accordance with Embodiment 1, the metal particles forming base electrode 106 break dielectric oxide layer 161 provided on the surface of positive electrode section 103, and are coupled to positive electrode body 102 by metallic bonding, thereby forming diffusion layer 105C. This structure allows base electrode 106 to be attached directly onto positive electrode body 102 with a large strength, and reduces a connection resistance between base electrode 106 and positive electrode body 102, thus reducing the ESR.

Solid electrolytic capacitor 1001 further includes middle electrode 107A formed on base electrode 106, and outer electrode 108A on middle electrode 107A. Outer electrode 108A can be formed directly on base electrode 106 by plating without middle electrode 107A.

Examples of solid electrolytic capacitor 1001 in accordance with Embodiment 1 will be described below. Surface 102A of positive electrode body 102 made of aluminum foil, i.e., valve metal foil, having a thickness of 0.1 mm was roughened to forming dielectric oxide layer 161. Then, resist 162 having an insulating property was formed on dielectric layer 161 to separate dielectric layer 161 into positive electrode deck 161A and negative electrode deck 161B. Solid electrolytic layer 163 made of conductive polymer was then formed on negative electrode deck 161B by an electrolytic polymerization method. Negative electrode layer 164 including a carbon layer and a silver paste layer was formed on solid electrolytic layer 163, thereby forming negative electrode section 104. Thereby, plural capacitor elements 101 having a plate shape having a length of 5.6 mm and a width of 3.4 mm were produced.

Next, four capacitor elements 101 were stacked to form stacked-element unit 1001A. Then, an upper surface and a lower surface of capacitor elements 101 of stacked-element unit 1001A were with insulating resin, and spaces between of negative electrode sections 104 were filled with the insulating resin, thereby providing package 105. Edge surface 105A and edge surface 105B of package 105 opposite to each other exposed edge surface 103A of positive electrode section 103 and edge surface 104A of negative electrode section 104, respectively.

Then, metal particles which were made of zinc and which had an average diameter of 10 μm collided with edge surface 105A of package 105 at various speeds, thereby forming base electrode 106 having a thickness of 5 μm. Middle electrode 107A made of conductive silver paste was formed on base electrode 106. Then, middle electrode 107B made of conductive sliver paste was formed on edge surface 104A of negative electrode sections 104 exposed from edge surface 105B of package 105. Finally, outer electrodes 108A and 108B were formed on middle electrodes 107A and 107B by plating molten solder to form external electrodes 165A and 165B, thus, producing examples 1 to 6 of the solid electrolytic capacitor having a rated voltage of 6.3V and a capacitance of 47 μF. The metal particles of examples 1 to 6 collided with edge surface 105A at the speed of 150 m/sec, 200 m/sec, 250 m/sec, 300 m/sec, 350 m/sec, and 400 m/sec, respectively.

Figure 21A:
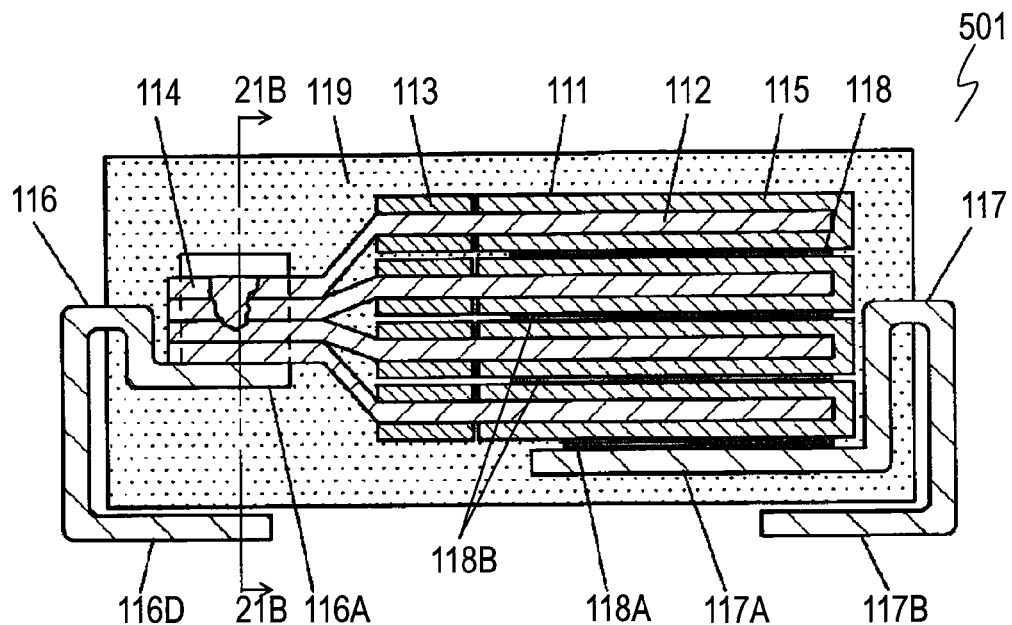
FIG. 21A is a sectional view of a conventional solid electrolytic capacitor.
Figure 21B:
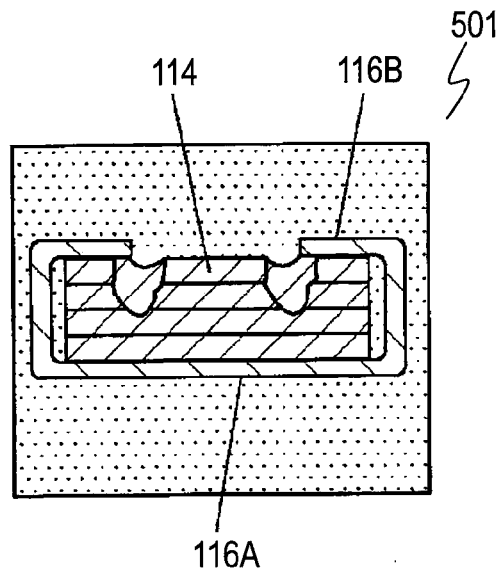
FIG. 21B is a sectional view of the solid electrolytic capacitor on line 21B-21B shown in FIG. 21A.

Comparative example 1 was produced by a similar method to examples 1 to 6 except for base electrode 106. External electrodes 165A and 165B including middle electrodes 107A and 107B and outer electrodes 108A and 108B were formed on edge surfaces 105A and 105B of package 105, respectively, thus producing comparative example 1. Comparative example 1 has a rated voltage of 6.3V and a capacitance of 47 μF. Comparative example 2 including positive common terminal 116 and negative terminal 117 shown in FIGS. 21A and 21B and having a rated voltage of 6.3V and a capacitance of 47 μF was produced.

Examples 1 to 6 and comparative examples 1 and 2 of the capacitor were measured in the capacitance, the ESR, the ESL, and a leakage current. FIG. 4 shows the measurement results.

As shown in FIG. 4, the examples having a collision speed of the metal particles for forming base electrode 106 lower than 200 m/sec have a large ESR. The examples having the speed exceeding 400 m/sec, higher than the speed of sound, have a large leakage current. The collision speed of the metal particles is preferably not lower than 200 m/sec and not higher than the speed of sound. The metal particles colliding with edge surface 105A at the speed within this range to form base electrode 106 provide the solid electrolytic capacitor with a smaller ESR, a smaller ESL, and a smaller leakage current than those of comparative examples 1 and 2.

Exemplary Embodiment 2

Figure 5:
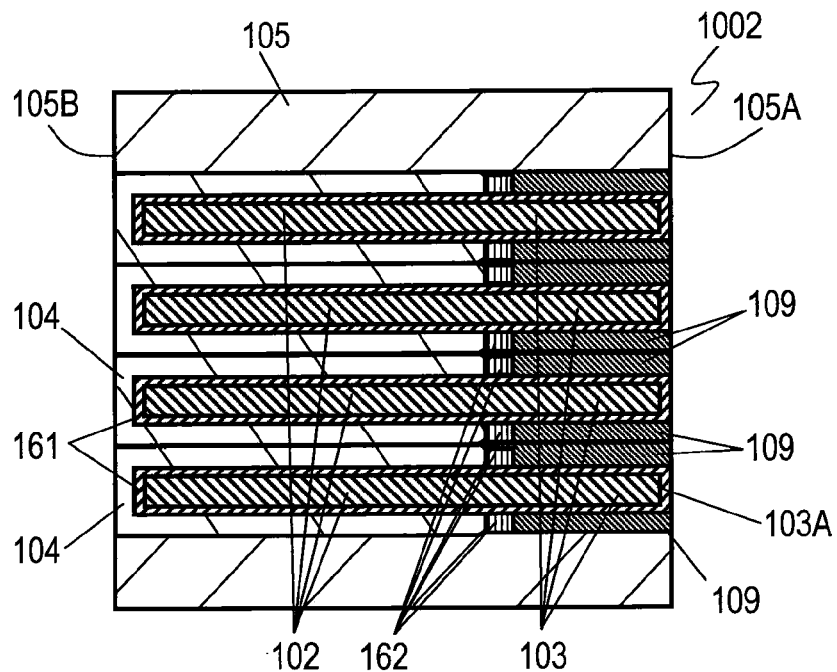
FIG. 5 is a sectional view of a solid electrolytic capacitor in accordance with Exemplary Embodiment 2 of the invention for illustrating a method of manufacturing the capacitor.

FIG. 5 is a sectional view of solid electrolytic capacitor 1002 in accordance with Exemplary Embodiment 2 of the invention for illustrating a method of manufacturing the capacitor. Solid electrolytic capacitor 1002 is a chip solid electrolytic capacitor. In FIG. 5, components identical to those of capacitor 1001 according to Embodiment 1 shown in FIGS. 1A to 3B are denoted by the same reference numerals, and their description will be omitted.

Solid electrolytic capacitor 1002 shown in FIG. 5 includes insulating resin layer 109 formed on a surface of positive electrode section 103 of capacitor element 101 in addition to solid electrolytic capacitor 1001 shown in FIG. 2B in accordance with Embodiment 1. Resin layer 109 has a thickness substantially equal to the height of negative electrode section 104 from dielectric oxide layer 161 so that the thickness of positive electrode section 103 can be substantially equal to that of negative electrode section 104. Resin layer 109 is made of epoxy resin; however, it is not limited to this material.

In capacitor 1002, no gap is provided between positive electrode sections 103 of stacked-element unit 1001A including stacked capacitor elements 101. This structure prevents positive electrode sections 103 of solid electrolytic capacitor 1002 from deforming due to an injection pressure of the resin when stacked-element unit 1001A is covered with package 105 made of the insulating resin, hence performing quality molding with accurate dimensions.

Exemplary Embodiment 3

Figure 6:
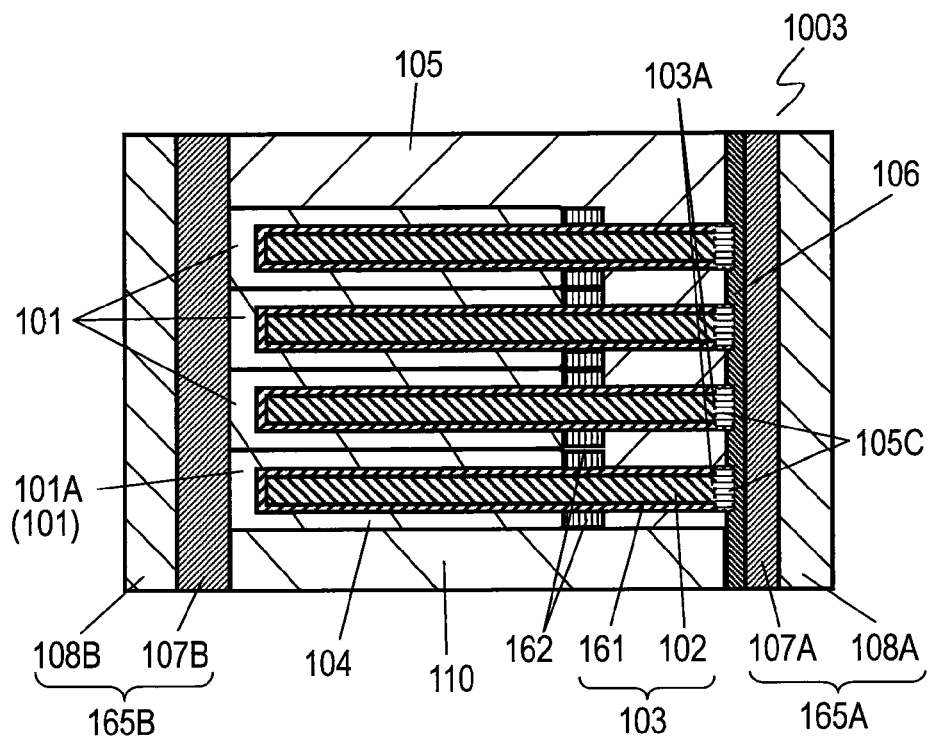
FIG. 6 is a sectional view of a solid electrolytic capacitor in accordance with exemplary Embodiment of the invention.

FIG. 6 is a sectional view of solid electrolytic capacitor 1003 in accordance with Exemplary Embodiment 3. In FIG. 6, components identical to those of capacitor 1001 according to Embodiment 1 shown in FIG. 1B are denoted by the same reference numerals, and their description will be omitted. Solid electrolytic capacitor 1003 is a chip solid electrolytic capacitor.

Solid electrolytic capacitor 1003 further includes substrate 110 having an insulating property and placed on a lower surface of stacked-element unit 1001A in addition to capacitor 1001. Substrate 110 is made of glass epoxy; however, it is not limited to this material. Capacitor 1003, a chip solid electrolytic capacitor, has so small size that the insulating resin of package 105 may not flow uniformly and steadily. Substrate 110 on the lower surface of stacked-element unit 1001A allows the resin to flow into unit 1001A uniformly even the size of capacitor 1003 is small. The resin thus can spread uniformly around each of capacitor elements 101, so that solid electrolytic capacitor 1003 has accurate dimensions and stable quality.

Exemplary Embodiment 4

Figure 7A:
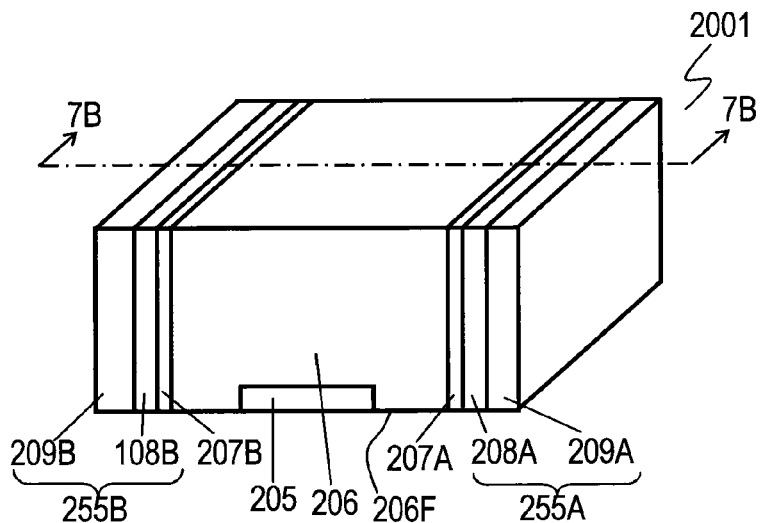
FIG. 7A is a perspective view of a solid electrolytic capacitor in accordance with exemplary Embodiment 4 of the invention.
Figure 7B:
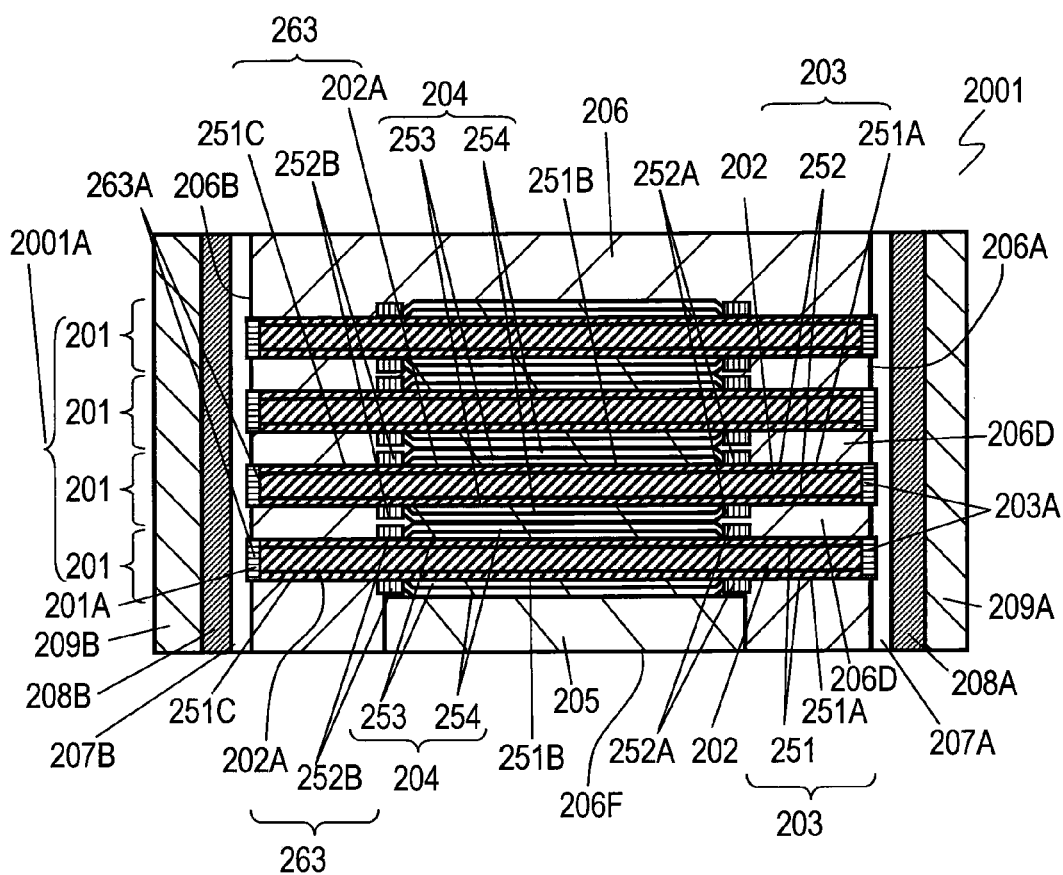
FIG. 7B is a sectional view of the solid electrolytic capacitor on line 7B-7B shown in FIG. 7A.

FIG. 7A is a perspective view of solid electrolytic capacitor 2001 in accordance with Exemplary Embodiment 4. FIG. 7B is a sectional view of solid electrolytic capacitor 2001 on line 7B-7B shown in FIG. 7A. Capacitor 2001 is a chip solid electrolytic capacitor.

Solid electrolytic capacitor 2001 includes plural capacitor elements 201 stacked together. Each of capacitor elements 201 includes positive electrode sections 203 and 263 and negative electrode section 204. Surface 202A of positive electrode body 202 made of valve metal foil, such as aluminum metal foil, having a thickness of 0.1 mm is roughened. Dielectric oxide layer 251 is formed on surface 202A of positive electrode body 202. Insulating resists 252A and 252B are formed on dielectric oxide layer 251. Resists 252A and 252B separate dielectric oxide layer 251 into positive electrode deck 251A, negative electrode deck 251B, and positive electrode deck 251C. Positive electrode decks 251A and 251C are provided at ends of positive electrode body 202, respectively. Negative electrode deck 251B is provided between positive electrode decks 251A and 251C. Solid electrolytic layer 253 made of conductive polymer is formed on negative electrode deck 251B. Conductive negative electrode layer 254 including a carbon layer and a silver paste layer is formed on solid electrolytic layer 253. Solid electrode layer 253 and negative electrode layer 254 constitute negative electrode section 204. Capacitor element 201 has a plate shape having a length of 5.6 mm and a width of 3.4 mm. Positive electrode section 203, negative electrode section 204, and positive electrode section 263 of each capacitor element 101 are arranged in this order along a longitudinal direction of the capacitor element.

Four capacitor elements 201 are stacked to provide stacked-element unit 2001A. The number of capacitor elements 201 forming stacked-element unit 2001A is not limited to four. Negative electrode conductor 205 is bonded to a lower surface of negative electrode section 204C of capacitor element 201A placed at the lowest position among the four capacitor elements 201. Negative electrode conductor 205 is made of a conductive plate, such as a copper plate.

Package 206 made of insulating resin covers stacked-element unit 2001A. Positive electrode section 203 has edge surface 203A exposed from edge surface 206A of package 206. Positive electrode section 263 has edge surface 263A exposed from edge surface 206B of package 206 opposite to edge surface 206A. A lower surface of negative electrode conductor 205 is exposed from lower surface 206F of package 206. Negative electrode conductor 205 functions as an external electrode connected to negative electrode layer 254.

Base electrode 207A is connected to edge surface 103A of positive electrode section 103, and covers edge surface 206A of package 206. Base electrode 207B is connected to edge surface 203A of positive electrode section 203 and covers edge surface 206B of package 206. Base electrodes 207A and 207B are made of zinc.

Middle electrodes 208A and 208B are formed on base electrodes 207A and 207B, respectively. Middle electrodes 208A and 208B are made of conductive paste, such as silver paste.

Outer electrodes 209A and 209B are formed on middle electrodes 208A and 208B, respectively. Outer electrodes 209A and 209B are made of conductive material, such as solder. According to this embodiment, the outer electrodes are formed by plating molten solder. Middle electrode 208A and outer electrode 209A constitute external electrode 255A provided on base electrode 207A. Middle electrode 208B and outer electrode 209B constitute external electrode 255B provided on base electrode 207B.

Figure 8A:
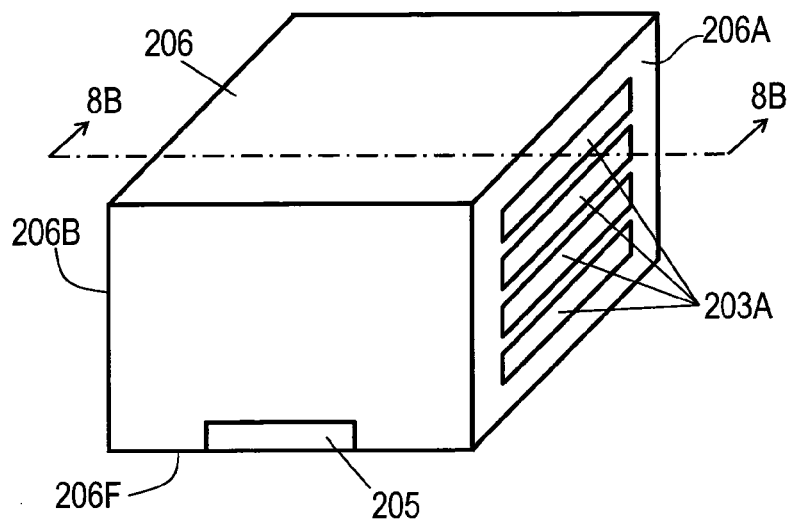
FIG. 8A is a perspective view of the solid electrolytic capacitor in accordance with Embodiment 4 for illustrating a method of manufacturing the capacitor.
Figure 8B:
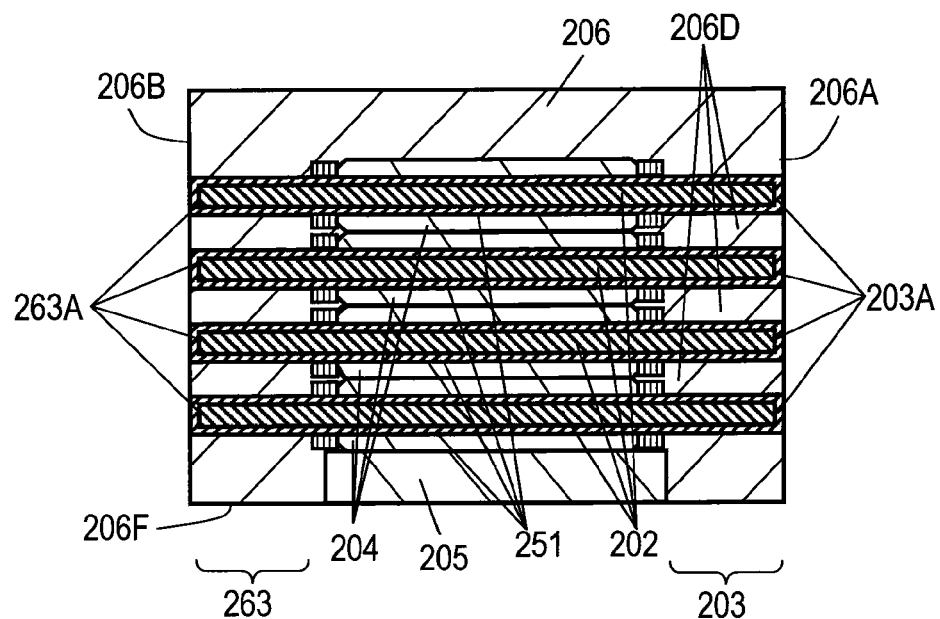
FIG. 8B is a sectional view of the solid electrolytic capacitor on line 8B-8B shown in FIG. 8A.

Next, a method for manufacturing solid electrolytic capacitor 2001 will be described below. FIG. 8A is a perspective view of package 206 covering stacked-element unit 2001A. FIG. 8B is a sectional view of package 206 on line 8B-8B shown in FIG. 8A. Package 206 includes sections 206D filling between positive electrode sections 203 and positive electrode sections 263 of plural capacitor elements 201. Plural capacitor elements 201 are stacked along one direction to form stacked-element unit 2001A. Negative electrode conductor 205 is bonded onto a lower surface of negative electrode section 204 of capacitor element 201A placed at the lowest position among four capacitor elements 201. Then, stacked-element unit 2001A and package 205 are integrally covered with package 206 made of insulating resin. Positive electrode section 203 of stacked-element unit 2001A has edge surface 203A exposed from edge surface 206A of package 206. Positive electrode section 263 has edge surface 263A exposed from edge surface 206B of package 206 opposite to edge surface 206A. Negative electrode conductor 205 has a lower surface exposed from lower surface 206F of package 206. Package 206 is made of insulating resin containing resin, such as epoxy resin, and 80 to 90% of inorganic filler, such as silica ($SiO_2$); however, the composition of package 206 is not limited to the foregoing composition.

Figure 9A:
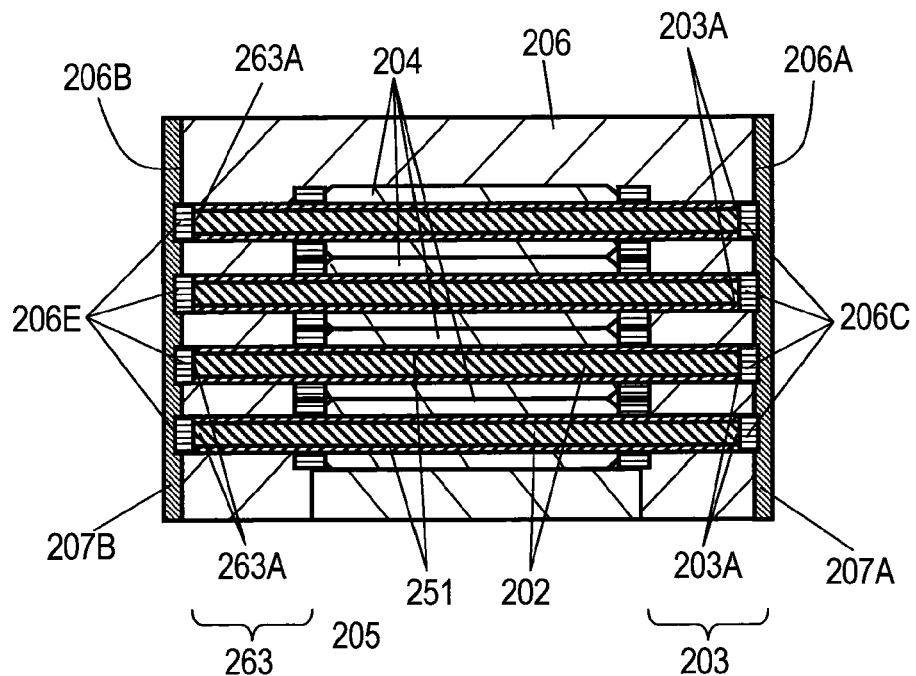
FIG. 9A is a sectional view of the solid electrolytic capacitor in accordance with Embodiment 4 for illustrating a method of manufacturing the capacitor.

FIG. 9A is a sectional view of package 206 and base electrodes 207A and 207B formed on package 206. Base electrode 207A is connected to edge surface 203A of positive electrode section 203 exposed from edge surface 206A of package 206, and covers edge surface 206A. Base electrode 207B is connected to edge surface 263A of positive electrode section 263 exposed from edge surface 206B of package 206, and covers edge surface 206B. Base electrodes 207A and 207B are metal layers formed by causing metal particles made of non-valve metal, such as zinc, to collide with edge surfaces 206A and 206B, respectively, at a speed not lower than 200 m/sec and not greater than the speed of sound, similarly to the method of forming base electrode 106 according to Embodiment 1 shown in FIG. 3A. The metal particles colliding with edge surfaces 203A and 263A of positive electrode sections 203 and 263 at such a high speed break dielectric oxide layer 251, and melt due to energy produced by plastic deformation of the particles due to the collision. The melting metal particles are attached securely to positive electrode body 202 of positive electrode section 203 made of valve metal by metallic bonding. Base electrodes 207A and 207B are preferably made of non-valve metal having a corrosion potential close to that of the valve metal of positive electrode body 202. Base electrodes 207A and 207B in accordance with Embodiment 4 are made of zinc having a corrosion potential close to that of aluminum forming positive electrode body 202; however, base electrodes 207A and 207B can be made of brass or copper. In the case that the valve metal, the material of positive electrode body 202, is tantalum, the metal particles of base electrodes 207A and 207B are preferably made of non-valve metal, such as copper or nickel, having a corrosion potential close to that of tantalum.

Figure 9B:
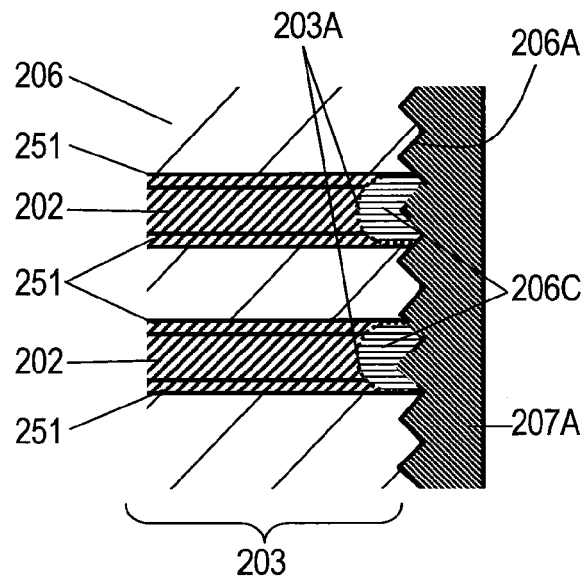
FIG. 9B is an enlarged cross-sectional view of the solid electrolytic capacitor shown in FIG. 9A.
Figure 9C:
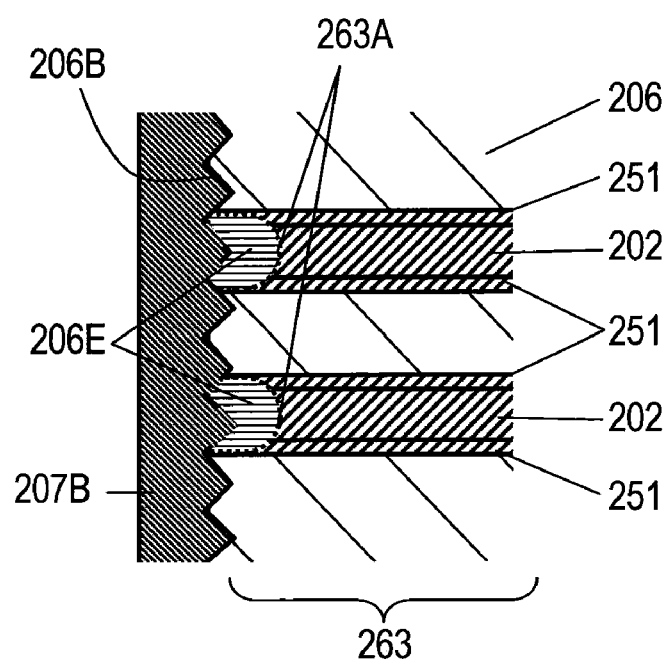
FIG. 9C is an enlarged cross-sectional view of the solid electrolytic capacitor shown in FIG. 9A.

FIGS. 9B and 9C are enlarged sectional views of package 206 shown in FIG. 9A. The metal particles which collide with positive electrode section 203 at a high speed and which melt produce diffusion layer 206C between positive electrode body 202 and base electrode 207A by coupling the valve metal of positive electrode body 202 with the non-valve metal of base electrode 207A by metallic boding. Base electrode 207A penetrates into edge surface 206A of package 206 to be embedded in edge surface 206A, thereby producing an anchor effect preventing base electrode 207A from being removed from edge surface 206A and particularly from being displaced along edge surface 206A. Similarly, the metal particles which collide with positive electrode section 203 at a high speed and which melt produce diffusion layer 206E between positive electrode body 202 and base electrode 207B by coupling the valve metal of positive electrode body 202 with the non-valve metal of base electrode 207B by metallic bonding. Base electrode 207B penetrates into edge surface 206B of package 206 to be embedded in base layer 207B, thereby producing an anchor effect preventing base electrode 207B from being removed from edge surface 206B and particularly from being displaced along edge surface 206B.

Base electrodes 207A and 207B are connected to positive electrode bodies 202 of positive electrode sections 203 and 263 via diffusion layers 206C and 206E, respectively. In diffusion layers 206C and 206E, the non-valve metal forming base electrode 207A is replaced by a part of the valve metal forming positive electrode body 202, is coupled to the valve metal by metallic bonding. This structure eliminates boundaries between base electrode 207A and positive electrode body 202 and between base electrode 207B and positive electrode body 202. This structure drastically reduces electric resistances between base electrode 207A and positive electrode body 202 and between base electrode 207B and positive electrode body 202, accordingly reducing an equivalent series resistance (ESR) of solid electrolytic capacitor 2001.

Base electrodes 207A and 207B are formed by causing the metal particles of non-valve metal, such as zinc, forming base electrode 106 according to Embodiment 1, to collide with edge surfaces 206A and 206B of package 206. The metal particles collide with these edge surfaces at a speed not lower than 200 m/sec and not greater than the speed of sound. Chip solid electrolytic capacitor 2001 includes positive electrode sections 203 ad 263 having edge surfaces 203A and 263A having a small area of about 0.3 mm$^2$. If base electrodes 207A and 207B are formed by a cold-spray method, which causes the metal particles with the edge surfaces at a speed higher than the speed of sound, the metal particles erode edge surfaces 203A and 263A of positive electrode sections 203 and 263, and do not form diffusion layer 206C or 206E, hence preventing base electrodes 207A and 207B from having a uniform thickness. On the other hand, the metal particles colliding at a speed lower than 200 m/sec form base electrodes 207A and 207B on edge surfaces 203A and 263A; however, do not form diffusion layers 206C and 206E due to weak impact hence preventing solid electrolytic capacitor 2001 from having a small ESR. The metal particles preferably have an average size ranging from 5 μm to 30 μm.

Edge surfaces 203A and 263A of positive electrode sections 203 and 263 exposed from edge surfaces 206A and 206B of package 206 have small areas. Sections 206D of package 206 filling between positive electrode sections 203 and 263 of plural capacitor elements 201 protect edge surfaces 203A and 263A from the colliding metal particles and allow edge surfaces 203A and 263A to be exposed from edge surfaces 206A and 206B of package 206. This structure allows positive electrode body 202 and the metal particles to form diffusion layers 206C and 206E, and allows base electrodes 207A and 207B to have a uniform thickness.

Middle electrodes 208A and 208B are then formed on base electrodes 207A and 207B, respectively. Electrodes 208A and 208B are made of conductive paste, such as silver paste, containing silver particles. Middle electrodes 208A and 208B can contain metal particles, such as silver plated particles of copper-nickel alloy or silver plated particles of copper, other than silver particles.

Then, outer electrodes 209A and 209B are formed on middle electrodes 208A and 208B by plating molten solder, respectively. Instead of the solder plating, outer electrodes 209A and 209B can be formed by general plating, such as nickel plating.

In solid electrolytic capacitor 2001, base electrodes 207A and 207B and outer electrodes 255A and 255B are formed on edge surfaces 203A and 263A of positive electrode sections 203 and 263 of stacked-element unit 2001A. This structure reduces the number of components as well as processes for assembly, and provides the capacitor with a small product cost and a small size. Further, this structure allows the electrodes are led out by a short length, accordingly reducing an equivalent series inductance (ESL) of the capacitor.

In solid electrolytic capacitor 2001 in accordance with Embodiment 4, diffusion layers 206C and 206E are formed by causing the metal particles forming base electrodes 207A and 207B to break dielectric oxide layer 251 formed on the surfaces of positive electrode sections 203 and 263, and are bonded to positive electrode body 202 by metallic bonding. This structure allows base electrodes 207A and 207B to attach directly to positive electrode body 202 with large strength, and reduces a connection resistance between base electrodes 207A and 207B and positive electrode body 202, thus reducing the ESR.

In solid electrolytic capacitor 2001, middle electrodes 208A and 208B are formed on base electrodes 207A and 207B, and outer electrodes 209A and 209B are formed on middle electrodes 208A and 208B, respectively. However, outer electrodes 209A and 209B can be formed directly on base electrodes 207A and 207B by plating without middle electrodes 208A and 208B.

Examples of solid electrolytic capacitor 2001 in accordance with Embodiment 4 will be described below. Surface 102A of positive electrode body 202 made of aluminum foil, valve metal foil, having a thickness of 0.1 mm was roughened to form dielectric oxide layer 251. Then, resists 252A and 252B having insulating property were formed on dielectric oxide layer 251 to separated dielectric oxide layer 251 into positive electrode decks 251A and 251C and negative electrode deck 251B. Solid electrolytic layer 253 made of conductive polymer was formed on negative electrode deck 251B by an electrolytic polymerization method. Negative electrode layer 254 including a carbon layer and a silver paste layer was formed on solid electrolytic layer 253 to form negative electrode section 204, thus producing plural capacitor elements 201 having a plate shape having a length of 5.6 mm and a width of 3.4 mm. Positive electrode section 203, negative electrode section 204, and positive electrode section 263 were arranged in this order along a longitudinal direction of each of capacitor elements 201

Next, four capacitor elements 201 were stacked to form stacked-element unit 2001A. Then, negative electrode conductor 205 was bonded to negative electrode section 204 of capacitor element 201A placed at the lowest position among stacked four capacitor elements 201. An upper surface of capacitor element 201 of stacked-element unit 2001A was covered with insulating resin, and the spaces between negative electrode sections 204 and positive electrode sections 203 as well as the spaces between negative electrode sections 204 and positive electrode sections 263 were filled with the insulating resin, thus forming package 206. Edge surfaces 203A and 263A of positive electrode sections 203 and 263 were exposed from edge surfaces 206A and 206B of package 206 opposite to each other, respectively. Negative electrode conductor 205 was exposed from lower surface 206F of package 206.

Then, metal particles made of zinc and having an average diameter of 10 μm collided with edge surfaces 206A and 206B of package 206 at various speeds, thereby forming base electrodes 207A and 207B having a thickness of 5 μm. Middle electrodes 208A and 208B made of conductive silver paste were formed on base electrodes 207A and 207B, respectively. Finally, outer electrodes 209A and 209B were formed on middle electrodes 208A and 208B by plating molten solder to form external electrodes 255A and 255B, thereby producing examples 7 to 12 of the solid electrolytic capacitor having a rated voltage of 2V and a capacitance of 120 μF. The collision speeds of the metal particles were 150 m/sec, 200 m/sec, 250 m/sec, 300 m/sec, 350 m/sec, and 400 m/sec for examples 7 to 12, respectively.

Comparative example 3 of a solid electrolytic capacitor was produced similarly to examples 7 to 12, except base electrodes 207A and 207B. Specifically, external electrodes 255A and 255B including middle electrodes 208A and 208B and outer electrodes 209A and 209B were formed on edge surfaces 206A and 206B of package 206 of comparative example 3, respectively. Comparative example 3 has a rated voltage 2V and a capacitance of 120 µF. Comparative example 4 of a solid electrolytic capacitor including positive common terminal 116 and negative terminal 117 shown in FIGS. 21A and 21B was produced. Comparative example 4 has a rated voltage of 2V and a capacitance of 120 µF.

Examples 7 to 12 and comparative examples 3 and 4 of the capacitor were measured in the capacitance, the ESR, the ESL, and a leakage current. FIG. 10 shows the measurement results.

As shown in FIG. 10, the examples having a collision speed of the metal particles for forming base electrodes 207A and 207B lower than 200 m/sec have a large ESR. The examples having the speed exceeding 400 m/sec, higher than the speed of sound have a large leakage current. The collision speed of the metal particles is preferably not lower than 200 m/sec and not higher than the speed of sound. The metal particles colliding with the edge surfaces at the speed within this range to form base electrodes 207A and 207B provide the solid electrolytic capacitor with a smaller ESR, a smaller ESL, and a smaller leakage current than those of comparative examples 3 and 4.

Exemplary Embodiment 5

Figure 11:
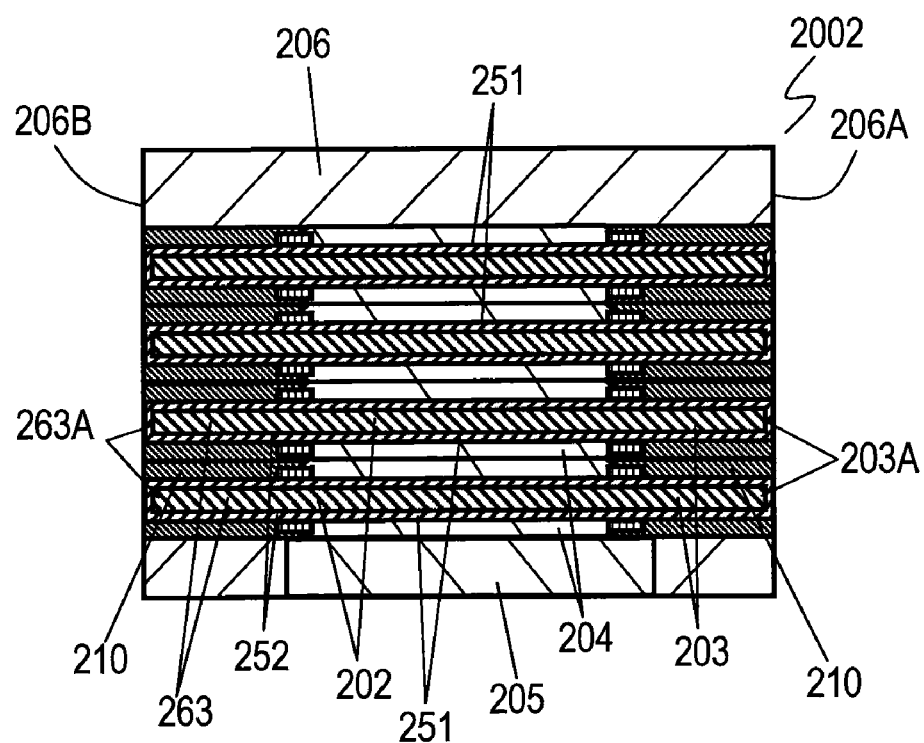
FIG. 11 is a sectional view of a solid electrolytic capacitor in accordance with Exemplary Embodiment 5 of the invention for illustrating a method of manufacturing the capacitor.

FIG. 11 is a sectional view of solid electrolytic capacitor 2002 in accordance with Exemplary Embodiment 7 of the invention for illustrating a method of manufacturing the capacitor. Capacitor 2002 is a chip solid electrolytic capacitor. In FIG. 11, components identical to those of capacitor 2001 according to Embodiment 4 shown in FIGS. 7A to 9B are denoted by the same reference numerals, and their description will be omitted.

Solid electrolytic capacitor 2002 shown in FIG. 11 further includes resin layer 210 having an insulating property and formed on surfaces of positive electrode sections 203 and 263 of capacitor element 201, in addition to solid electrolytic capacitor 2001 shown in FIG. 8A in accordance with Embodiment 4. Resin layer 210 has a thickness substantially equal to the height of negative electrode section 204 from dielectric oxide layer 251 so that the thickness of positive electrode sections 203 and 263 can be substantially equal to that of negative electrode section 204. Resin layer 210 is made of epoxy resin; however, it is not limited to this material.

Solid electrolytic capacitor 2002 has no spaces between positive electrode sections 203 and between positive electrode sections 263 in stacked-element unit 2001A including stacked plural capacitor elements 201. This structure prevents positive electrode sections 203 and 263 of solid electrolytic capacitor 2002 from deforming due to an injection pressure of the resin when stacked-element unit 2001A is covered with package 206 made of the insulating resin, thus providing the capacitor with stable quality molding and accurate dimensions.

Exemplary Embodiment 6

Figure 12A:
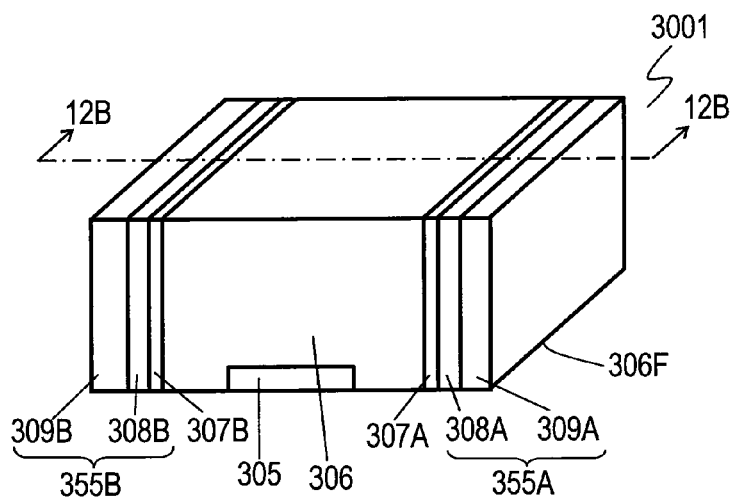
FIG. 12A is a perspective view of a solid electrolytic capacitor in accordance with exemplary Embodiment 6.
Figure 12B:
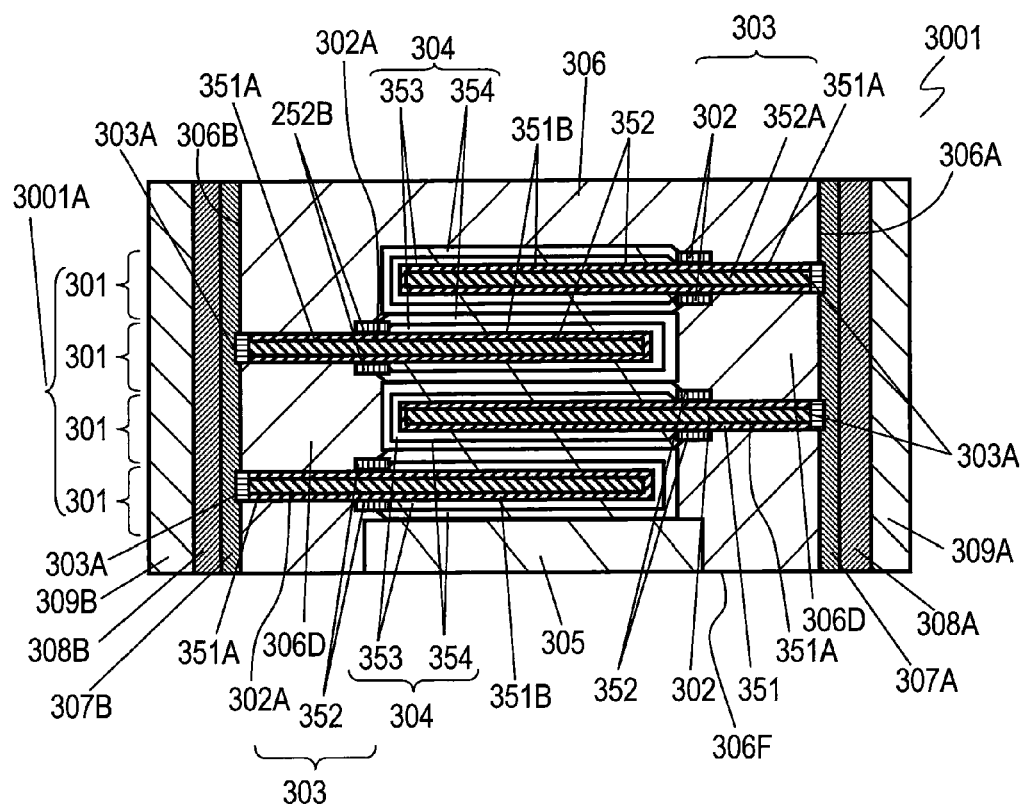
FIG. 12B is a sectional view of the solid electrolytic capacitor on line 12B-12B shown in FIG. 12A.

FIG. 12A is a perspective view of solid electrolytic capacitor 3001 in accordance with Exemplary Embodiment 6. FIG. 12B is a sectional view of solid electrolytic capacitor 3001 on line 12B-12B shown in FIG. 12A. Capacitor 3001 is a chip solid electrolytic capacitor.

Solid electrolytic capacitor 3001 includes plural capacitor elements 301 stacked together. Each of capacitor elements 301 includes positive electrode section 303 and negative electrode section 304. Surface 302A of positive electrode body 302 made of aluminum foil, valve metal foil, having a thickness of 0.1 mm is roughened. Dielectric oxide layer 351 is formed on surface 302A of positive electrode body 302. Resist 352 having an insulating property is formed on dielectric oxide layer 351. Resist 352 separates dielectric oxide layer 351 into positive electrode deck 351A and negative electrode deck 351B. Solid electrolytic layer 353 made of conductive polymer is formed on negative electrode deck 351B. Conductive negative electrode layer 354 including a carbon layer and a silver paste layer is formed on solid electrolytic layer 353. Solid electrolytic layer 353 and negative electrode layer 354 constitute negative electrode section 304. Capacitor element 301 has a plate shape having a length of 5.6 mm and a width of 3.4 mm. Positive electrode section 303 and negative electrode section 304 are arranged in this order along a longitudinal direction of capacitor element 301

Four capacitor elements 301 are stacked together such that positive electrode sections 303 are alternately directed to opposite directions, thus providing stacked-element unit 3001A. The number of capacitor elements 301 forming stacked-element unit 3001A is not limited to four. Negative electrode conductor 305 is bonded to a lower surface of negative electrode section 304 of capacitor element 301A placed at the lowest position among four capacitor elements 301. Negative electrode conductor 305 is made of a conductive plate, such as a copper plate.

Package 306 made of insulating resin covers stacked-element unit 3001A. Edge surfaces 303A of two positive electrode sections 303 out of the plural positive electrode sections 303 are exposed edge surface 306A of package 306. Edge electrodes 303A of the other two positive electrode sections 303 are expose from edge surface 306B of package 306 opposite to edge surface 306A. A lower surface of negative electrode conductor 305 is exposed from lower surface 306F of package 306. Negative electrode conductor 305 functions as an external electrode connected to negative electrode layer 354.

Base electrode 307A is connected to edge surface 303A of positive electrode section 303, and covers edge surface 306A of package 306. Base electrode 307B is connected to edge surface 303A of positive electrode section 303 and covers edge surface 306B of package 306. Base electrodes 307A and 307B are made of zinc.

Middle electrodes 308A and 308B are formed on base electrodes 307A and 307B, respectively. Middle electrodes 308A and 308B are made of conductive paste, such as silver paste.

Outer electrodes 309A and 309B are formed on middle electrodes 308A and 308B, respectively. Outer electrodes 309A and 309B are made of conductive material, such as solder. According to this embodiment, outer electrodes 309A and 309B are formed by plating molten solder. Middle electrode 308A and outer electrode 309A constitute external electrode 355A provided on base electrode 307A. Middle electrode 308B and outer electrode 309B constitute external electrode 355B provided on base electrode 307B.

Figure 13A:
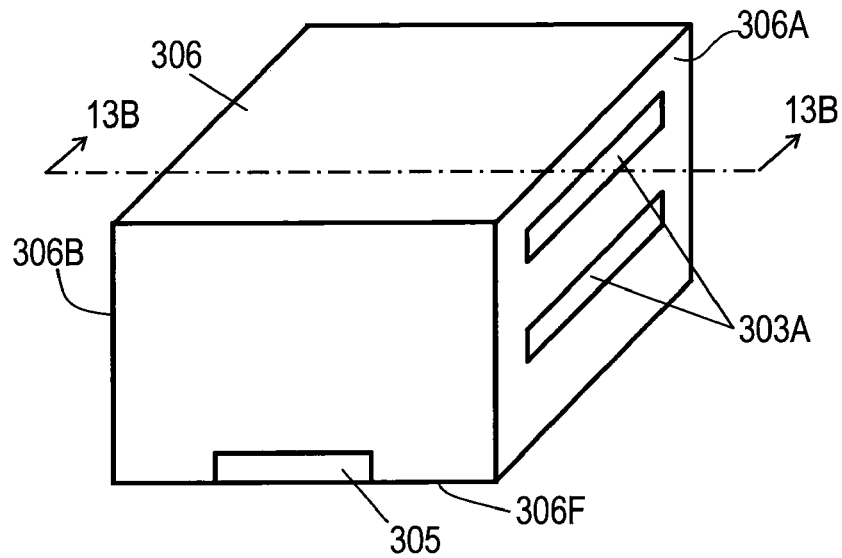
FIG. 13A is a perspective view of the solid electrolytic capacitor in accordance Embodiment 6 for illustrating a method of manufacturing the capacitor.
Figure 13B:
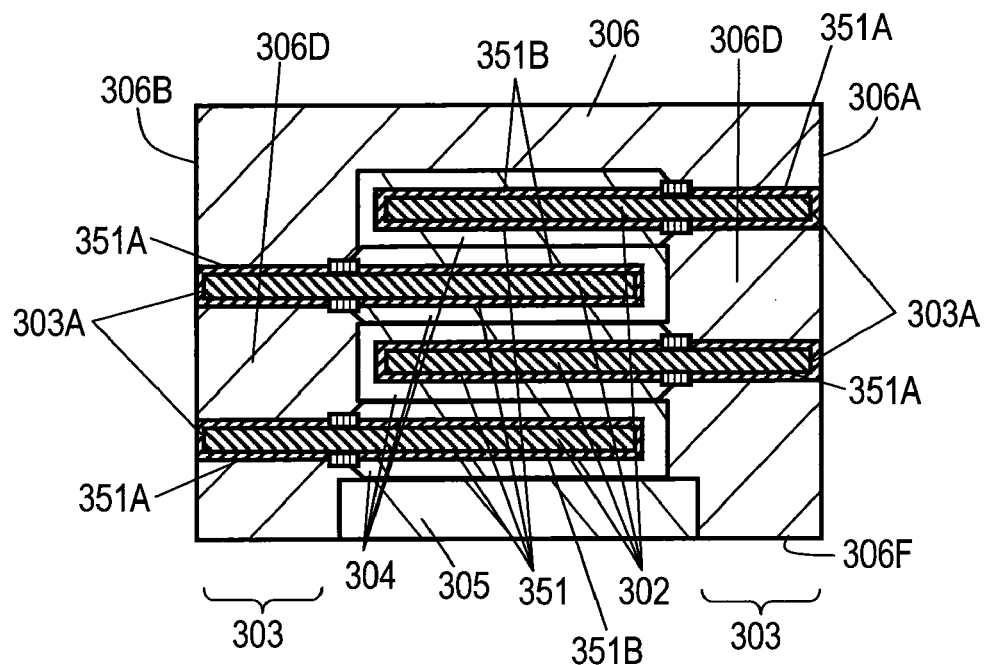
FIG. 13B is a sectional view of the solid electrolytic capacitor on line 13B-13B shown in FIG. 13A.

Next, a method for manufacturing solid electrolytic capacitor 3001 in accordance with Embodiment 6 will be described below. FIG. 13A is a perspective view of package 306 covering stacked-element unit 3001A. FIG. 13B is a sectional view of package 306 on line 13B-13B shown in FIG. 13A. Sections 306D of package 306 includes sections 306D fills between positive electrode sections 303. Plural capacitor elements 301 are alternately stacked such that positive electrode sections 303 are directed alternately in opposite directions, thus providing stacked-element unit 3001A. Negative electrode conductor 305 is bonded to a lower surface of negative electrode section 304 of capacitor element 301A placed at the lowest position of stacked-element unit 3001A. Then, stacked-element unit 3001 and package 305 are integrally covered with package 306 made of insulating resin. Positive electrode section 303 of stacked-element unit 3001 has edge surface 303A exposed from edge surface 306A of package 306. Positive electrode section 303 has edge surface 303A exposed from edge surface 306B of package 306 opposite to edge surface 306A. Negative electrode conductor 305 has a lower surface exposed from a lower surface 306F of package 306. Package 306 is made of the insulating resin which contains resin, such as epoxy resin, and 80 to 90% of inorganic filler, such as silica ($SiO_2$); however, the composition of package 206 are not limited to the above composition.

Figure 14A:
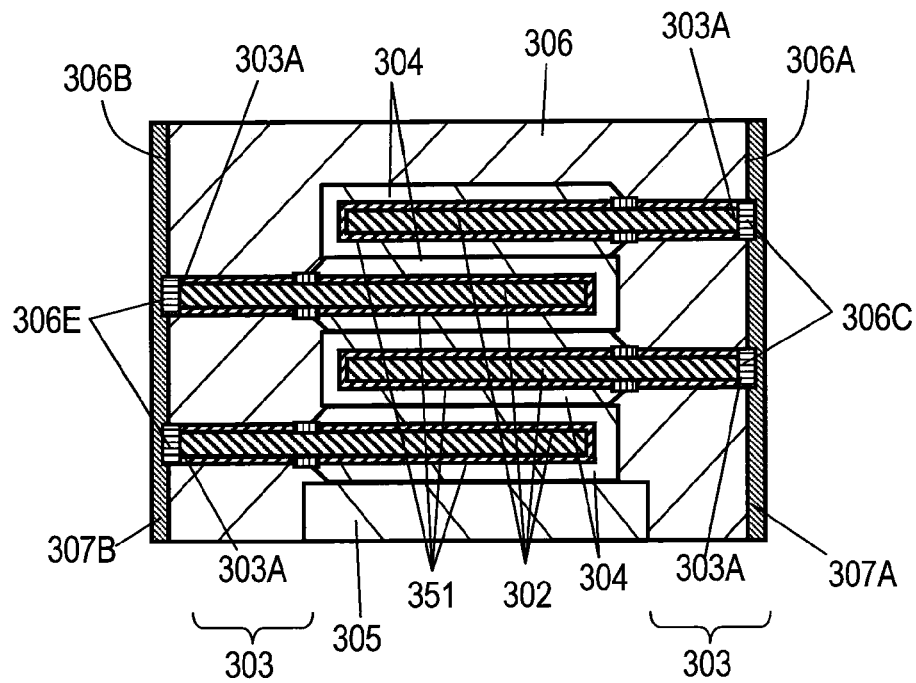
FIG. 14A is a sectional view of the solid electrolytic capacitor in accordance Embodiment 7 for illustrating a method of manufacturing the capacitor.

FIG. 14A is a sectional view of package 306 and base electrodes 307A and 307B formed on package 306. Base electrode 307A is connected to edge surface 303A of positive electrode section 303 exposed from edge surface 306A of package 306, and covers edge surface 306A. Base electrode 307B is connected to edge surface 303A of positive electrode section 303 exposed from edge surface 306B of package 306, and covers edge surface 306B. Base electrodes 307A and 307B are metal layers which are formed by causing metal particles made of non-valve metal, such as zinc, to collide with edge surfaces 306A and 306B at a speed not small than 200 m/sec and not greater than the speed of sound, respectively, similarly to base electrode 106 according to Embodiment 1 shown in FIG. 3A. The metal particles colliding with edge surface 303A of positive electrode section 303 at such a high speed break dielectric oxide layer 351, and melt due to energy produced by plastic deformation at the collision. The melting metal particles adhere strongly to positive electrode body 302, made of valve metal, of positive electrode section 303 by metallic bonding. Base electrode 307A and 307B are preferably made of non-valve metal having a corrosion potential close to that of the valve metal of positive electrode body 302. Base electrodes 307A and 307B in accordance with Embodiment 6 are made of zinc having a corrosion potential close to that of aluminum forming positive electrode body 302; however, Base electrodes 307A and 307B can be made of brass or copper. In the case that the valve metal of positive electrode body 302 is tantalum, the metal particles of base electrodes 307A and 307B are preferably made of non-valve metal, such as copper or nickel, having a corrosion potential close to that of the tantalum.

Figure 14B:
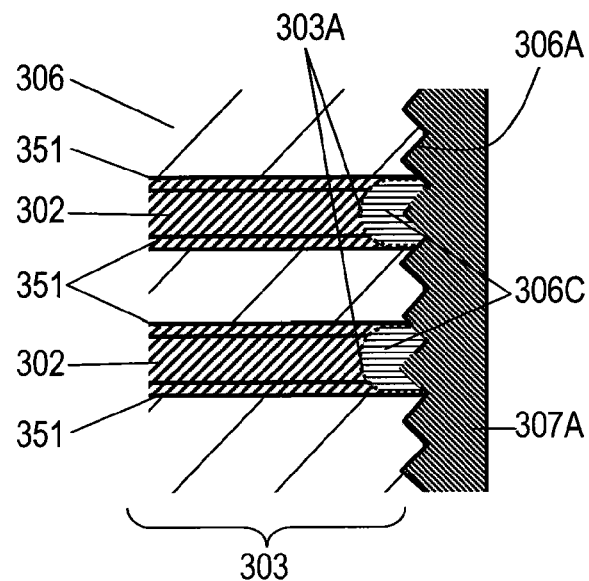
FIG. 14B is an enlarged cross-sectional view of the solid electrolytic capacitor shown in FIG. 14A.
Figure 14C:
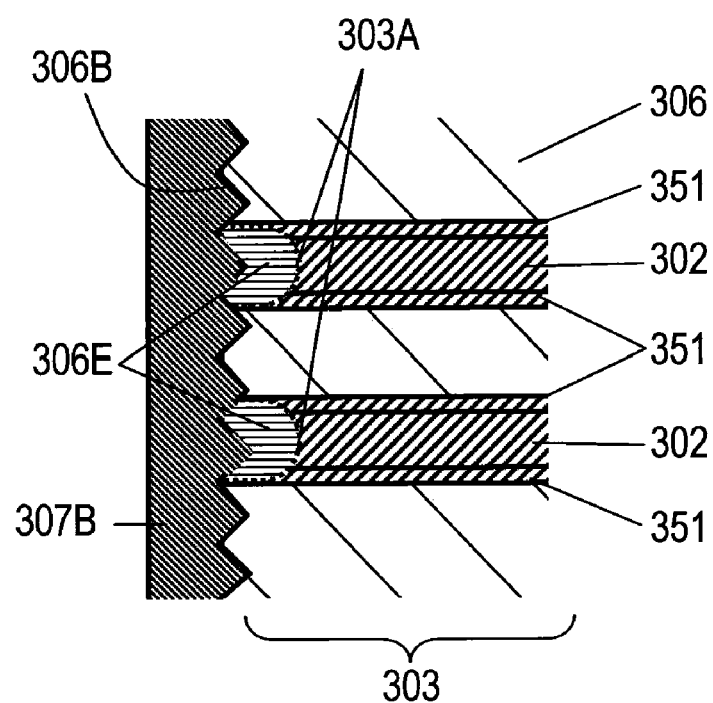
FIG. 14C is an enlarged cross-sectional view of the solid electrolytic capacitor shown in FIG. 14A.

FIGS. 14B and 14C are enlarged sectional views of package 306 shown in FIG. 14A. The metal particles melting due to the collision with positive electrode section 303 at a high speed form diffusion layer 306C between positive electrode body 302 and base electrode 307A by coupling the valve metal of positive electrode body 302 to the non-valve metal of base electrode 307A by metallic bonding. Base electrode 307A penetrates into edge surface 306A of package 306 and is embedded in edge surface 306A, thus providing an anchor effect for preventing base electrode 307A from being removed from edge surface 306A and from being displaced along edge surface 306A. Similarly, the metal particles melting due to the collision with positive electrode section 303 at a high speed are melted form diffusion layer 306F between positive electrode body 302 and base electrode 307B by coupling the valve metal of positive electrode body 302 to the non-valve metal of base electrode 307B by metallic bonding. Base electrode 307B penetrates into edge surface 306B of package 306, and is embedded in edge surface 306B providing an anchor effect for preventing base electrode 307B from being removed from edge surface 306B and from being displaced along edge surface 306B.

Base electrodes 307A and 307B are connected to positive electrode bodies 302 of positive electrode sections 303 via diffusion layers 306C and 306E, respectively. In diffusion layers 306C and 306E, a portion of the non-valve metal forming base electrode 307A is replaced by a portion of the valve metal forming positive electrode body 302, and is coupled with the non-valve metal by metallic bonding, thereby providing no boundary between base electrode 307A and positive electrode body 302 and between base electrode 307B and positive electrode body 302. This structure extremely reduces electric resistances between base electrode 307A and positive electrode body 302 and between base electrode 307B and positive electrode body 302, thus reducing an equivalent series resistance (ESR) of solid electrolytic capacitor 3001.

Base electrodes 307A and 307B are formed by causing the metal particles of non-valve metal, such as zinc, forming base electrode 106 according to Embodiment 1 to collide with edge surfaces 306A and 306B of package 306, respectively. The metal particles collide with these edge surfaces at a speed not smaller than 200 m/sec and not greater than the speed of sound. In chip solid electrolytic capacitor 3001, edge surface 303A of positive electrode section 303 has a small area of about 0.3 mm$^2$. If base electrodes 307A, 307B are formed by a cold-spray method causing the metal particles to collide with the edge surfaces at a speed higher than the speed of sound, the metal particles erode edge surfaces 303A of positive electrode sections 303, and do not form diffusion layer 306C or 306E, thus preventing base electrodes 307A and 307B from having a uniform thickness. On the other hand, the metal particles colliding at a speed lower than 200 m/sec form base electrodes 307A and 307B on edge surfaces 306A and 306B, and 303A; however, d not form diffusion layers 306C or 306E due to weak impact, hence preventing solid electrolytic capacitor 3001 from having a small ESR. The metal particles preferably have an average diameter ranging from 5 μm to 30 μm.

Edge surfaces 303A of positive electrode sections 303 exposed from edge surfaces 306A and 306B of package 306 have a small area. Sections 306D of package 306 filling between positive electrode sections 303 of plural capacitor elements 301 protect edge surfaces 303A from the collision of the metal particles and allow edge surfaces 303A to be exposed from edge surfaces 306A of package 306. This structure allows positive electrode body 302 and the metal particles to form diffusion layers 306C and 306E, and allows base electrodes 307A and 307B to have a uniform thickness.

Middle electrodes 308A and 308B are then formed on base electrodes 307A and 307B, respectively. Middle electrodes 308A and 308B are made of conductive paste, such as silver paste, containing silver particles. The conductive paste can contain metal particles, such as copper-nickel alloy particles plated with silver or copper particles plated with silver, other than silver particles.

Then, outer electrodes 309A and 309B are formed on middle electrodes 308A and 308B by plating molten solder, respectively. Instead of solder plating, outer electrodes 309A and 309B can be formed by general plating, such as nickel plating.

In solid electrolytic capacitor 3001, base electrodes 307A and 307B and outer electrodes 355A and 355B are formed on edge surfaces 303A of positive electrode sections 303 of stacked-element unit 3001A. This structure reduces the number of components as well as processes for assembly, and reduces its production cost and the size of the capacitor. The respective electrodes are led out by a short length, accordingly reducing an equivalent series inductance (ESL) of the capacitor.

In solid electrolytic capacitor 3001 in accordance with Embodiment 6, the metal particles forming base electrodes 307A and 307B break dielectric oxide layer 351 formed on the surfaces of positive electrode sections 303 and is bonded to positive electrode body 302 by metallic bonding, thereby forming diffusion layers 306C and 306E. This structure allows base electrodes 307A, 307B to attach directly to positive electrode body 302 with a large strength, and reduces a connection resistance between positive electrode body and each of base electrodes 307A and 307B accordingly, thus reducing the ESR.

In solid electrolytic capacitor 3001, middle electrodes 308A and 308B formed on base electrodes 307A and 307B, and outer electrodes 309A and 309B formed on middle electrodes 308A and 308B. Alternatively, outer electrodes 309A and 309B can be formed directly on base electrodes 307A and 307B by plating without middle electrodes 308A and 308B.

Examples of solid electrolytic capacitor 3001 in accordance with Embodiment 6 will be described below. Surface 302A of positive electrode body 302 made of aluminum foil, i.e., valve metal foil, having a thickness of 0.1 mm was roughened to form dielectric oxide layer 351. Then, resist 352 having an insulating property was on layer 351 to separate dielectric oxide layer 351 into positive electrode deck 351A and negative electrode deck 351B. Solid electrolytic layer 353 made of conductive polymer is then formed on negative electrode deck 351B by an electrolytic polymerization method. Negative electrode layer 354 including a carbon layer and a silver paste layer is formed on solid electrolytic layer 353, thereby forming negative electrode section 304, thereby producing plural capacitor elements 301 having a plate shape having a length of 5.6 mm and a width of 3.4 mm. In each one of the capacitor elements 301, positive electrode section 303, negative electrode section 304 are arranged along the longitudinal direction.

Next, four capacitor elements 201 were stacked alternately along a direction opposite to each other, thereby forming stacked-element unit 3001A. Then, negative electrode conductor 305 was bonded to negative electrode section 304 of capacitor element 301A placed at the lowest position among four capacitor elements 301. An upper surface of capacitor element 301 of stacked-element unit 3001A were covered with insulating resin, and spaces between negative electrode sections 304 and positive electrode sections 303 were covered with the insulating resin, thereby forming package 306. Edge surface 303A of positive electrode section 303 were exposed from edge surface 306A and edge surface 306B of package 306 opposite to each other. Negative electrode conductor 305 was exposed from lower surface 306F of package 306.

Then, the metal particles made of zinc and having an average diameter of 10 μm collided with edge surfaces 306A and 306B of package 306 at various speeds, thereby forming base electrodes 307A and 307B having a thickness of 5 μm. Middle electrodes 308A and 308B made of conductive silver paste were formed on base electrodes 307A and 307B, respectively. Finally, outer electrodes 309A and 309B were formed on middle electrodes 308A and 308B by plating molten solder, thereby forming external electrodes 355A and 355B, respectively. Examples 13 to 18 of the solid electrolytic capacitor having a rated voltage of 2V and a capacitance of 220 μF were thus produced. The collision speeds of the metal particles were 150 m/sec, 200 m/sec, 250 m/sec, 300 m/sec, 350 m/sec, and 400 m/sec for examples 13 to 18, respectively.

Comparative example 5 of the solid electrolytic capacitor was produced similarly to examples 13 to 18 except base electrodes 307A and 307B. Specifically, comparative example 5 included external electrodes 355A and 355B including middle electrodes 308A and 308B and outer electrodes 309A and 309B formed on edge surfaces 306A and 306B of package 306. Comparative example 5 had a rated voltage of 2V and a capacitance of 220 μF. Comparative example 6 of a solid electrolytic capacitor including positive common terminal 116 and negative terminal 117 shown in FIGS. 21A and 21B and having a rated voltage of at 2V and a capacitance of 220 μF was produced.

Examples 13 to 18 and comparative examples 5 and 6 of the capacitor were measured in the capacitance, the ESR, the ESL, and a leakage current. FIG. 15 shows the measurement results.

As shown in FIG. 15, the examples having a collision speed of the metal particles for forming base electrodes 307A and 307B lower than 200 m/sec have a large ESR. The examples having a collision speed exceeding 400 m/sec, higher than the speed of sound, have a large leakage current. The collision speed of the metal particles is thus preferably not lower than 200 m/sec and not higher than the speed of sound. The metal particles collide with the edge surfaces at the speed within this range for forming base electrodes 307A and 307B, and provide the solid electrolytic capacitor with smaller ESR and ESL and a smaller leakage current than comparative examples 5 and 6.

Exemplary Embodiment 7

Figure 16:
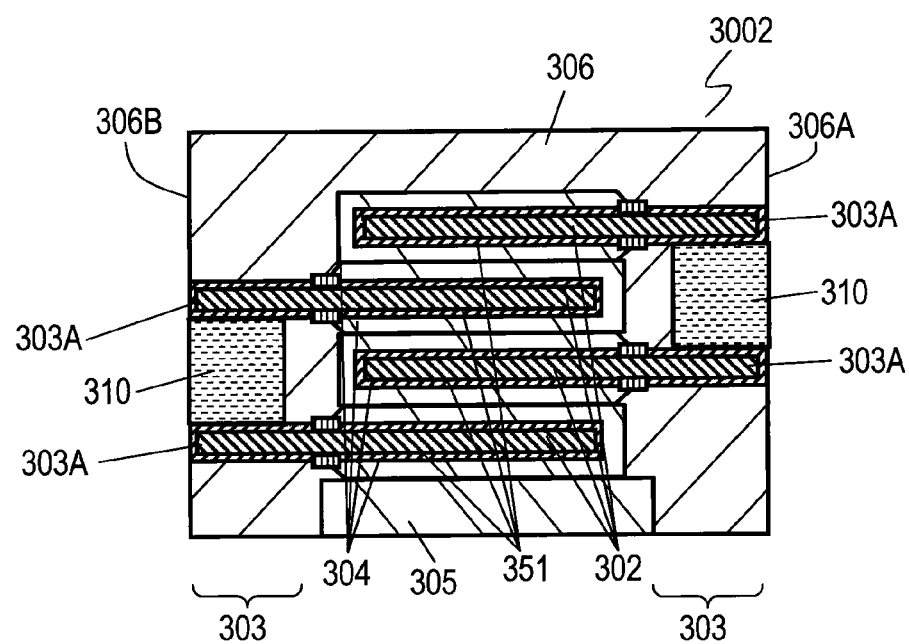
FIG. 16 is a sectional view of a solid electrolytic capacitor in accordance with exemplary Embodiment 7 of the invention for illustrating a method of manufacturing the capacitor.

FIG. 16 is a sectional view of solid electrolytic capacitor 3002 in accordance with Exemplary Embodiment 7 of the invention for illustrating a method of manufacturing the capacitor. Capacitor 3002 is a chip solid electrolytic capacitor. In FIG. 16, components identical to those of capacitor 3001 according to Embodiment 6 shown in FIGS. 12A to 14C are denoted by the same reference numerals, and their description will be omitted.

Solid electrolytic capacitor 3002 shown in FIG. 16 further includes insulating spacers 310 between positive electrode sections 303 of stacked-element unit 3001A, in addition to solid electrolytic capacitor 3001 in accordance with Embodiment 6 shown in FIGS. 12A to 14C. Positive electrode sections 303 of plural capacitor elements 301 forming stacked-element unit 3001A protrude alternately in directions opposite to each other. Spacers 310 are provided between positive electrode sections 303 among plural positive electrode sections 303 protruding in the same direction such that spacers 310 contacts electrode sections 303 protruding in the same direction. Spacers 310 prevent positive electrode sections 303 from deforming due to an injection pressure of the resin when stacked-element unit 3001A is covered with the insulating resin for forming package 306, and maintain the spaces between positive electrode sections 303, hence performing quality molding with accurate dimensions.

Exemplary Embodiment 8

Figure 17A:
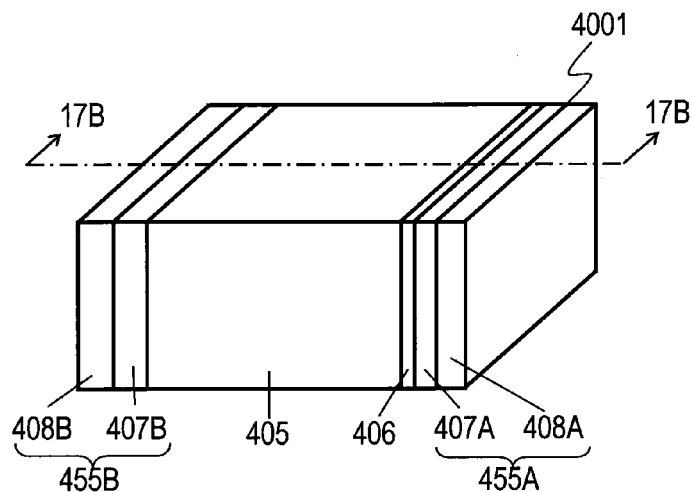
FIG. 17A is a perspective view of a solid electrolytic capacitor in accordance with Exemplary Embodiment 8 of the invention for illustrating a method of manufacturing the capacitor.
Figure 17B:
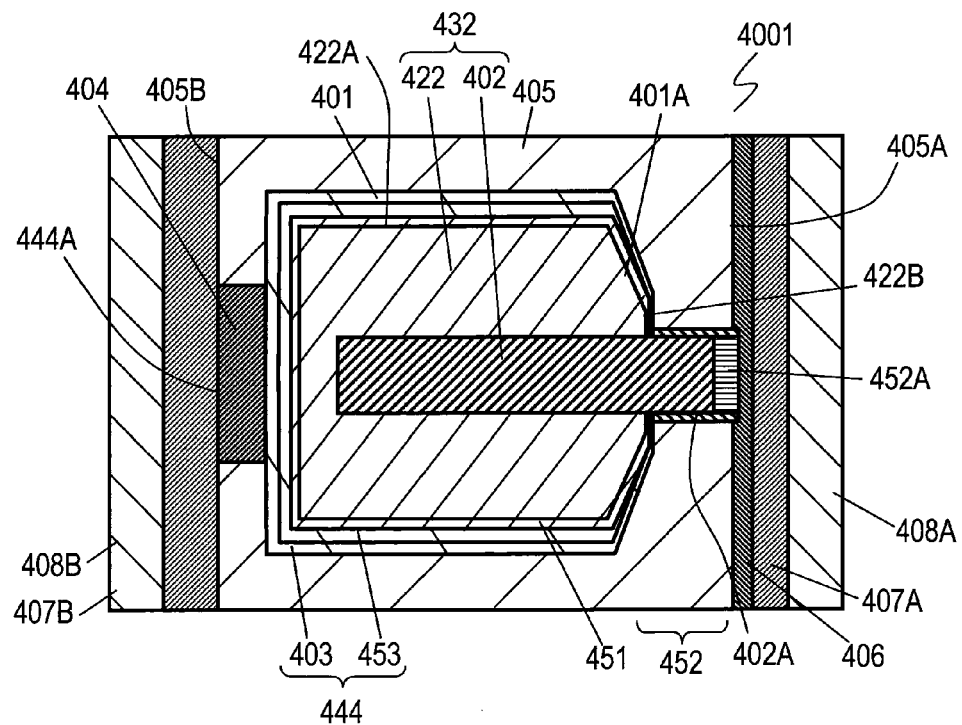
FIG. 17B is a sectional view of the solid electrolytic capacitor on line 17B-17B shown in FIG. 17A.

FIG. 17A is a perspective view of solid electrolytic capacitor 4001 in accordance with Exemplary Embodiment 8 of the present invention. FIG. 17B is a sectional view of capacitor 4001 on line 17B-17B shown in FIG. 17A. Capacitor 4001 is a chip solid electrolytic capacitor.

Solid electrolytic capacitor 4001 includes capacitor element 401 having positive electrode section 452 and negative electrode section 444. Positive lead-wire 402 is a wire having a diameter of 0.5 mm and made of valve metal, such as tantalum. Metal pellet 422 is formed by molding powder of valve metal, such as tantalum, together with positive lead-wire 402, with a press-molding die to have a circular column shape. Positive lead-wire 402 is embedded in edge surface 422B of metal pellet 422. Edge surface 422B has a cone shape protruding from an outer periphery of capacitor element 401 to positive lead-wire 402, thus constituting reinforcing section 401A. Metal pellet 422 is sintered, and forms positive electrode body 432 together with positive lead-wire 402. Sintered metal pellet 422 is anodized to form dielectric oxide layer 451 on surface 422A of metal pellet 422 as well as on surface 402A of positive lead-wire 402. Metal pellet 422, positive lead-wire 402, and dielectric oxide layer 451 constitute positive electrode section 452. Solid electrolytic layer 453 made of conductive polymer is formed on dielectric oxide layer 451. Negative electrode layer 403 made of carbon and silver paste is formed on solid electrolytic layer 453. Edge surface 422B of metal pellet 422 may not necessarily have the cone shape constituting reinforcing section 401A.

Negative electrode conductor 404 made of a silver rivet is bonded to negative electrode layer 403; however it can be made of any conductive material other than a silver rivet, such as conductive paste. Solid electrolytic layer 453, negative electrode layer 403, and negative electrode conductor 404 constitute negative electrode section 444.

Package 405 made of insulating resin covers negative electrode conductor 404 and capacitor element 401. Positive lead-wire 402, i.e. edge surface 452A of positive electrode 452, is exposed from edge surface 405A of package 405. Negative electrode conductor 404, i.e., edge surface 444A of negative electrode section 444 is exposed from edge surface 405B of package 405 opposite to edge surface 405A.

Base electrode 406 is connected to positive lead-wire 402, i.e., positive electrode body 432, via edge surface 452A of positive electrode section 452, and covers edge surface 405A of package 405. Base electrode 406 is made of copper.

Middle electrode 407B is connected to edge surface 444A of negative electrode section 444 and covers edge surface 405B of package 405. Middle electrode 407A is formed on base electrode 406. Both of middle electrodes 407A and 407B are made of conductive paste, such as silver paste.

Outer electrodes 408A and 408B are formed on middle electrodes 407A and 407B, respectively. Outer electrodes 408A and 408B are made of conductive material, such as solder. According to this embodiment, the outer electrodes are formed by plating molten solder. Middle electrode 407A and outer electrode 408A constitute external electrode 455A provided on base electrode 406. Middle electrode 407B and outer electrode 408B are connected to edge surface 444A of negative electrode section 444, thus constituting external electrode 455B provided on edge surface 405B of package 405.

Figure 18A:
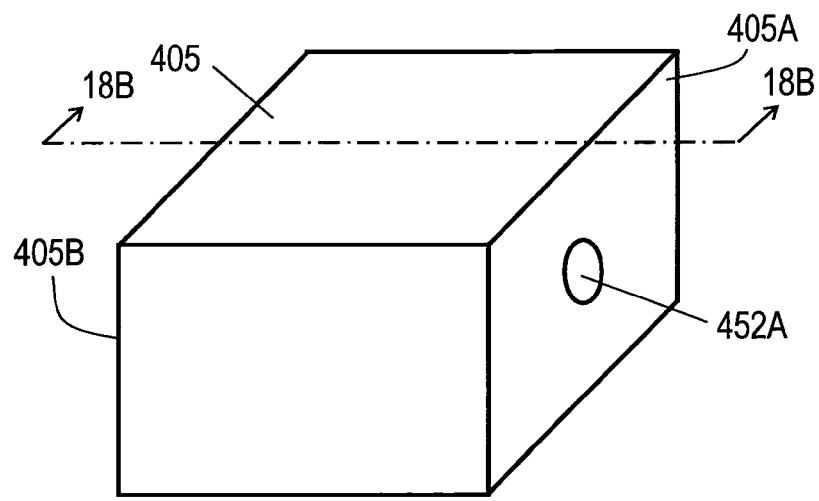
FIG. 18A is a perspective view of the solid electrolytic capacitor in accordance with Embodiment 8 for illustrating a method of manufacturing the capacitor.
Figure 18B:
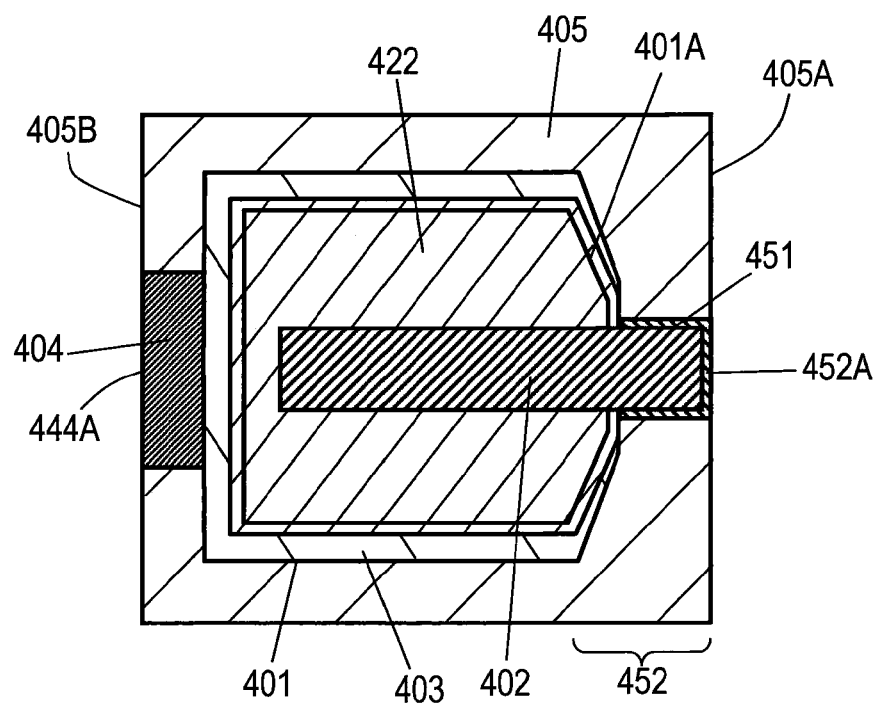
FIG. 18B is a sectional view of the solid electrolytic capacitor on line 18B-18B shown in FIG. 18A.

Next, a method for manufacturing solid electrolytic capacitor 4001 in accordance with Embodiment 8 will be described below. FIG. 18A is a perspective view of package 405 covering stacked-element unit 4001A. FIG. 18B is a sectional view of package 405 on line 18B-18B shown in FIG. 18A. Negative electrode conductor 404 is bonded to negative electrode layer 403 of capacitor element 401. Capacitor element 401 is then covered with resin for forming package 405. Edge surface 452A of positive electrode section 452, i.e., positive lead-wire 402, of capacitor element 401 is exposed from edge surface 405A of package 405. Edge surface 444A of negative electrode section 444, i.e., negative electrode conductor 404, is exposed from edge surface 405B of package 405 opposite to edge surface 405A. Package 405 is made of insulating resin containing resin, such as epoxy resin, and 80 to 90% of inorganic filler, such as silica ($SiO_2$); however, the composition of package 405 are not limited to this one.

Figure 19A:
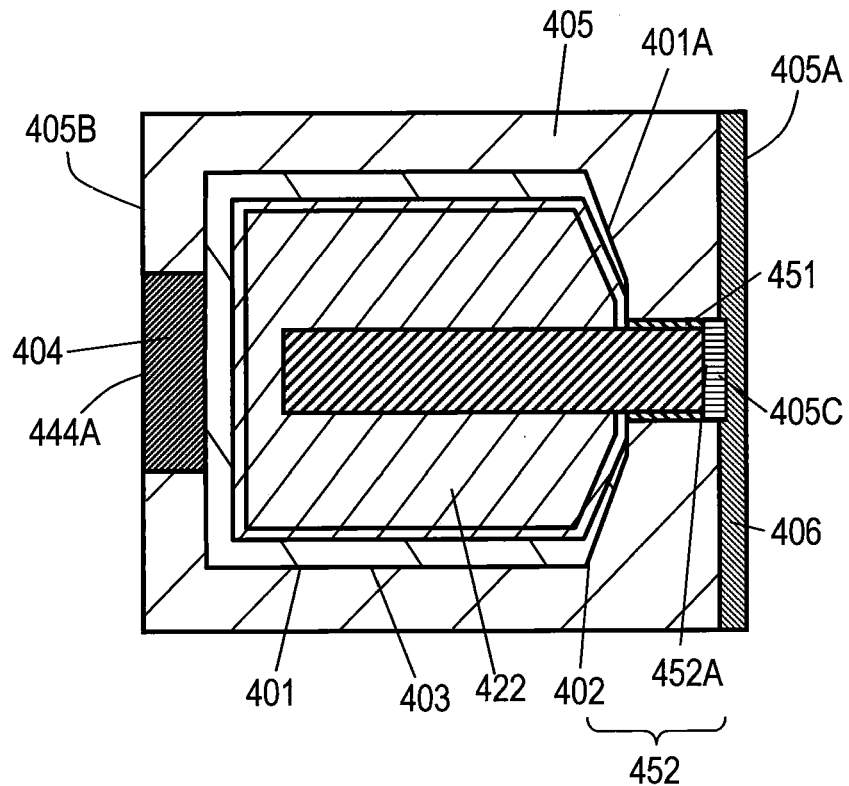
FIG. 19A is a sectional view of the solid electrolytic capacitor in accordance with Embodiment 8 for illustrating a method of manufacturing the capacitor.

FIG. 19A is a sectional view of package 405 and base electrode 406 on package 405. Base electrode 406 is connected to edge surface 452A of positive electrode section 452 exposed from edge surface 405A of package 405 and covers edge surface 405A. Base electrode 406 is a metal layer formed by causing metal particles made of non-valve metal, such as copper, to collide with edge surface 405A of package 405 at a speed not smaller than 200 m/sec and not greater than the speed of sound. The metal particles colliding with edge surface 452A of positive electrode section 452 at such a high speed break dielectric oxide layer 451, and melt due to energy produced by plastic deformation due to the collision. The melting metal particles adheres strongly to positive electrode body 432 made of valve metal of positive electrode section 452 by metallic bonding. Base electrode 406 is preferably made of non-valve metal having a corrosion potential close to that of the valve metal forming positive electrode body 432. Base electrode 406 in accordance with Embodiment 8 is made of copper having a corrosion potential close to that of tantalum forming positive electrode body 432; however, the base electrode can be made of nickel. In the case of the valve metal of positive electrode body 432 is aluminum, the metal particles of base electrode 406 are preferably made of non-valve metal, such as zinc or brass, having a corrosion potential close to that of the aluminum.

Figure 19B:
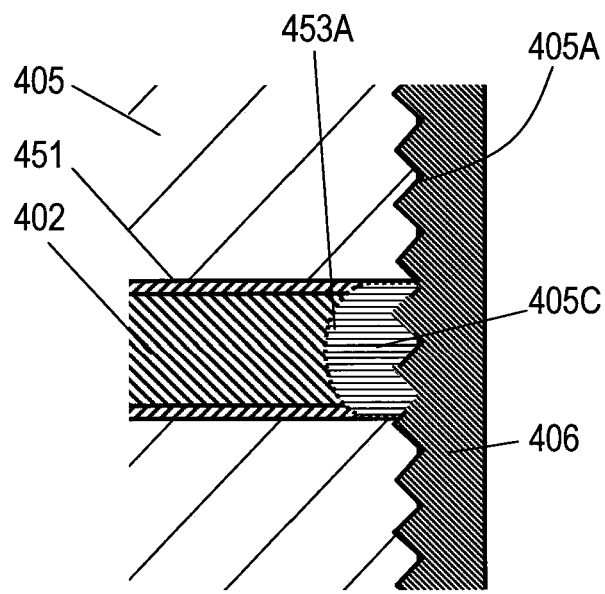
FIG. 19B is an enlarged cross-sectional view of the solid electrolytic capacitor shown in FIG. 19A.

FIG. 19B is enlarged sectional views of package 405 shown in FIG. 19A. The metal particles colliding with positive electrode section 452 at a high speed melt, and form diffusion layer 405C between positive electrode body 432 (positive lead-wire 402) and base electrode 406 by coupling the valve metal of positive electrode body 432 (positive lead-wire 402) to the non-valve metal of base electrode 406 by metallic bonding. A part of base electrode 406 penetrates into edge surface 405A of package 405, and is embedded in edge electrode 406, thus providing an anchor effect for preventing base electrode 406 from being removed from edge surface 405A and from being displaced along edge surface 405A.

Base electrode 406 is connected to positive electrode body 432 (positive lead-wire 402) of positive electrode section 452 via diffusion layer 405C. In diffusion layer 405C, a portion of the non-valve metal forming base electrode 406 is replaced by a portion of the valve metal forming positive electrode body 432, so that the portion of the valve metal is coupled with the non-valve metal by metallic bonding, thereby providing no boundary between base electrode 406 and positive electrode body 432. This structure extremely reduces an electric resistance between base electrode 406 and positive electrode body 432, accordingly reducing an equivalent series resistance (ESR) of solid electrolytic capacitor 4001.

Base electrode 406 is formed by causing the metal particles made of non-valve metal, such as copper, to collide with edge surface 405A of package 405 at a speed not smaller than 200 m/sec and not greater than the speed of sound. Edge surface 452A of positive electrode body 432 (positive lead-wire 402) of solid electrolytic capacitor 4001, a chip capacitor, has a small area of about 0.3 mm². If base electrode 406 is formed by a cold-spray method which causes the metal particles to collide at a speed higher than the speed of sound, the metal particles erode edge surface 452A of positive electrode section 452, do not form diffusion layer 405C, thus preventing base electrode 406 from having a uniform thickness. On the other hand, the metal particles colliding at a speed lower than 200 m/sec form base electrode 406 on edge surfaces 405A and 452A; however, do not form diffusion layer 405C due to weak impact, thus preventing solid electrolytic capacitor 4001 from having a small EER. The metal particles preferably have an average diameter ranging from 5 μm to 30 μm.

Middle electrode 407B connected to edge surface 444A of negative electrode section 444 exposed from edge surface 405B of package 405 is then formed to cover edge surface 405B. Middle electrode 407A is formed on base electrode 406. Both of middle electrodes 407A and 407B are made of conductive paste, such as silver paste, containing silver particles. The conductive paste can contain metal particles, such as copper-nickel alloy particles with plated silver or copper particles with plated silver.

Then, outer electrodes 408A and 408B are formed on middle electrodes 407A and 407B by plating molten solder, respectively. Instead of solder plating, outer electrodes 408A and 408B can be formed by ordinary plating, such as nickel plating.

In solid electrolytic capacitor 4001, base electrode 406 and outer electrodes 455A and 455B are formed on edge surfaces 452A and 444A of positive electrode section 452 and negative electrode section 444 of stacked-element unit 4001A. This structure reduces the number of components and processes for assembly, accordingly reducing its production cost the size of the capacitor. The electrodes are led out by a short length, thereby reducing an equivalent series inductance (ESL) of the capacitor.

In solid electrolytic capacitor 4001 in accordance with Embodiment 8, the metal particles forming base electrode 406 break dielectric oxide layer 451 formed on the surface of positive electrode body 432 (positive lead-wire 402), and then, are bonded to positive electrode body 432 by metallic bonding, thereby forming diffusion layer 405C. This structure allows base electrode 406 to adhere directly to positive electrode body 432 (positive lead-wire 402) with a large strength, and reduce a connection resistance between base electrode 406 and positive electrode body 432, thus reducing the ESR.

In solid electrolytic capacitor 4001, middle electrode 407A is formed on base electrode 406, and outer electrode 408A is formed on middle electrode 407A. Alternatively, outer electrode 408A can be formed directly on base electrode 406 by plating without middle electrode 407A.

Examples of electrolytic capacitor 4001 in accordance with Embodiment 8 will be described below.

Metal pellet 422 having the circular column shape was formed by molding the powder of tantalum, i.e. valve metal, with a press-mold die on positive lead-wire 402 made of tantalum wire having a diameter of 0.5 mm. Metal pellet 422 was sintered to form porous positive electrode body 432. Porous positive electrode body 432 was then anodized to form dielectric oxide layer 451 on surface 422A of metal pallet 422. Solid electrolytic layer 453 made of conductive polymer was formed on dielectric oxide layer 451. Negative electrode layer 403 made of carbon and silver paste was formed on the surface of solid electrolytic layer 453, thereby forming capacitor element 401.

Next, negative electrode conductor 404 made of a silver rivet was joined to negative electrode layer 403 of capacitor element 401. Capacitor element 401 was covered with insulating resin, thereby forming package 405. Edge surface 444A of negative electrode conductor 404 was exposed from edge surface 405A of package 405. Edge surface 452A of positive lead-wire 402 was exposed from edge surface 405B of package 405 opposite to edge surface 405A.

Then, metal particles made of copper and having an average diameter of 10 μm collided with edge surface 405A of package 405 at various speeds, thereby forming base electrode 406 having a thickness of 5 μm. Middle electrode 407A made of conductive silver paste was formed on base electrode 406. Middle electrode 407B made of conductive sliver paste was formed on edge surface 444A of negative electrode section 444 exposed from edge surface 405B of package 405. Finally, outer electrodes 408A and 408B were formed on middle electrodes 407A and 407B by plating molten solder, thereby forming external electrodes 455A and 455B. Examples 19 to 24 of the solid electrolytic capacitor having a rated voltage of 6.3V and a capacitance of 100 μF were thus produced. The metal particles collided with edge surface 405A at a speed of 150 m/sec, 200 m/sec, 250 m/sec, 300 m/sec, 350 m/sec, and 400 m/sec for examples 19 to 24, respectively.

Figure 22:
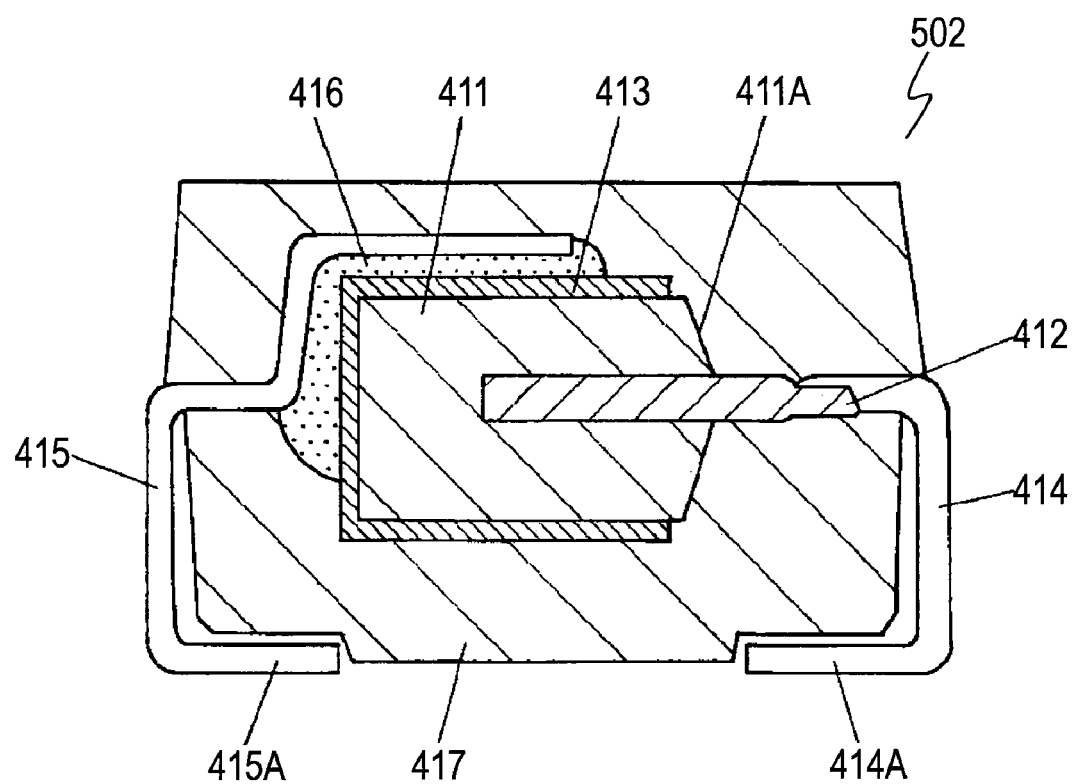
FIG. 22 is a sectional view of another conventional chip solid electrolytic capacitor.

Comparative example 7 was produced similarly to examples 19 to 24 except base electrode 406. Specifically, external electrodes 455A and 455B including middle electrodes 407A and 407B and outer electrodes 408A and 408B were formed on edge surfaces 405A and 405B of package 405, respectively, thereby producing comparative example 7 having a rated voltage of 6.3V and a capacitance of 100 μF. Comparative example 8 including positive lead terminal 414 and negative lead terminal 415 shown in FIG. 22 was produced. Comparative example 8 had a rated voltage of 6.3V and a capacitance of 100 μF.

Examples 19 to 24 and comparative examples 7 and 8 of the capacitor were measured in the capacitance, the ESR, the ESL, and a leakage current. FIG. 20 shows the measurement results.

As shown in FIG. 20, the examples having the collision speed of the metal particles for forming base electrode 406 lower than 200 m/sec have a large ESR. The examples having the collision speed exceeding 400 m/sec, higher than the speed of sound, have a large leakage current. The collision speed of the metal particles is thus preferably not lower than 200 m/sec and not higher than the speed of sound. The metal particles colliding with edge surface 405A at the speed within this range for forming base electrode 406 provides the solid electrolytic capacitor with a smaller ESR, a smaller ESL, and a smaller leakage current than comparative examples 7 and 8.

INDUSTRIAL APPLICABILITY

A solid electrolytic capacitor according to the present invention reduces the number of components and processes to reduce its cost and to have a small size, and has a small equivalent series resistance and a small equivalent series inductance, and is thus useful as capacitors for various fields.

The invention claimed is:
1. A solid electrolytic capacitor comprising:
  a first capacitor element including
    a first positive electrode body made of valve metal,
    a first dielectric oxide layer provided on a surface of the first positive electrode body,
    a first solid electrolytic layer made of conductive polymer provided on the first dielectric oxide layer, and
    a first negative electrode layer provided on the first solid electrolytic layer;
  a package made of insulating resin covering the first capacitor element, the package having a first edge surface from which the first positive electrode body is exposed;

a first base electrode provided at the first edge surface of the package and made of non-valve metal coupled with the first positive electrode body;

a first diffusion layer for connecting the first positive electrode body to the first base electrode, the first diffusion layer being made of the valve metal of the first positive electrode body and the non-valve metal of the first base electrode;

a first external electrode provided on the first base electrode; and a second external electrode connected to the first negative electrode layer, wherein the first base electrode is a metal layer made of metal particles made of the non-valve metal colliding with the first edge surface of the package at a speed not smaller than 200 msec and not greater than a speed of sound.

2. The solid electrolytic capacitor according to claim 1, further comprising:

a second capacitor element including
 a second positive electrode body made of the valve metal and exposed from the first edge surface of the package,
 a second dielectric oxide layer provided on a surface of the second positive electrode body,
 a second solid electrolytic layer made of conductive polymer provided on the second dielectric oxide layer, and
 a second negative electrode layer provided on the second solid electrolytic layer; and a second diffusion layer for connecting the second positive electrode body to the first base electrode, the second diffusion layer being made of the valve metal of the second positive electrode body and the non-valve metal of the first base electrode, wherein the first capacitor element and the second capacitor element are stacked to form a stacked-element unit such that the first negative electrode layer contacts the second negative electrode layer, the package covers the stacked-element unit such that the insulating resin fills a space between the first positive electrode body and the second positive electrode body, and the second external electrode includes a negative electrode conductor which is bonded to the first negative electrode layer of the first capacitor element and which is exposed from the package.

3. The solid electrolytic capacitor according to claim 2, further comprising a resin layer having an insulating property provided on the first positive electrode body.

4. The solid electrolytic capacitor according to claim 1, wherein the first positive electrode body includes
 a porous metal pellet made of powder of the valve metal, and
 a positive lead-wire made of the valve metal connected to the first diffusion layer and embedded in the metal pellet.

5. The solid electrolytic capacitor according to claim 1, further comprising:

a second base electrode provided at a second edge surface of the package opposite to the first edge surface of the package, the second base electrode being made of non-valve metal coupled to the first positive electrode body;

a second diffusion layer for connecting the first positive electrode body to the second base electrode, the second diffusion layer being made of the valve metal of the first positive electrode body and the non-valve metal of the second base electrode; and a third external electrode provided on the second base electrode, wherein the second external electrode includes a negative electrode conductor which is bonded to the first negative electrode layer of the first capacitor element and which is exposed from the package.

6. The solid electrolytic capacitor according to claim 5, wherein the second base electrode is a metal layer made of metal particles made of the non-valve metal colliding with the second edge surface of the package at a speed not smaller than 200 msec and not greater than a speed of sound.

7. The solid electrolytic capacitor according to claim 1, further comprising:

a second capacitor element including
 a second positive electrode body made of the valve metal and exposed from a second edge surface of the package opposite to the first edge surface of the package,
 a second dielectric oxide layer provided on a surface of the second positive electrode body,
 a second solid electrolytic layer made of conductive polymer provided on the second dielectric oxide layer, and
 a second negative electrode layer provided on the second solid electrolytic layer;

a second base electrode provided at the second edge surface of the package, the second base electrode being made of non-valve metal coupled to the second positive electrode body;

a second diffusion layer for connecting the second positive electrode body to the second base electrode, the second diffusion layer being made of the valve metal of the second positive electrode body and the non-valve metal of the second base electrode; and a third external electrode provided on the second base electrode, wherein the first capacitor element and the second capacitor element are stacked to form a stacked-element unit such that the first negative electrode layer contacts the second negative electrode layer, the package covers the stacked-element unit such that the insulating resin fills a space between the first positive electrode body and the second positive electrode body, and the second external electrode includes a negative electrode conductor which is bonded to the first negative electrode layer of the first capacitor element and which is exposed from the package.

8. The solid electrolytic capacitor according to claim 7, further comprising:

a third capacitor element including
 a third positive electrode body made of the valve metal and exposed from the first edge surface of the package,
 a third dielectric oxide layer provided on a surface of the third positive electrode body,
 a third solid electrolytic layer made of conductive polymer provided on the third dielectric oxide layer, and
 a third negative electrode layer provided on the third solid electrolytic layer; and a spacer having an insulating property provided between the first positive electrode body of the first capacitor element and the third positive electrode body of the third capacitor element.

9. The solid electrolytic capacitor according to according to claim 7, wherein the second base electrode is a metal layer made of metal particles made of the non-valve metal colliding with the second edge surface of the package at a speed not smaller than 200 msec and not greater than a speed of sound.

10. The solid electrolytic capacitor according to claim 1, wherein the first exterior electrode includes
a middle electrode provided on the first base electrode, and
an outer electrode provided on the middle electrode.

11. The solid electrolytic capacitor according to claim 1, further comprising a substrate having an insulting property provided on the first negative electrode layer of the first capacitor element.

12. The solid electrolytic capacitor according to claim 1, wherein the second external electrode includes
a middle electrode provided on a surface of the package and made of conductive particles, and
an outer electrode provided on the middle electrode.

13. A solid electrolytic capacitor comprising:
a first capacitor element including
a first positive electrode body made of valve metal,
a first dielectric oxide layer provided on a surface of the first positive electrode body,
a first solid electrolytic layer made of conductive polymer provided on the first dielectric oxide layer, and
a first negative electrode layer provided on the first solid electrolytic layer;
a package made of insulating resin covering the first capacitor element, the package having a first edge surface from which the first positive electrode body is exposed;
a first base electrode provided at the first edge surface of the package and made of non-valve metal coupled with the first positive electrode body;
a first diffusion layer for connecting the first positive electrode body to the first base electrode, the first diffusion layer being made of the valve metal of the first positive electrode body and the non-valve metal of the first base electrode;
a first external electrode provided on the first base electrode;
a second external electrode connected to the first negative electrode layer;
a second base electrode provided at a second edge surface of the package opposite to the first edge surface of the package, the second base electrode being made of non-valve metal coupled to the first positive electrode body;
a second diffusion layer for connecting the first positive electrode body to the second base electrode, the second diffusion layer being made of the valve metal of the first positive electrode body and the non-valve metal of the second base electrode; and
a third external electrode provided on the second base electrode, wherein the second external electrode includes a negative electrode conductor which is bonded to the first negative electrode layer of the first capacitor element and which is exposed from the package, and
the second base electrode is a metal layer made of metal particles made of the non-valve metal colliding with the second edge surface of the package at a speed not smaller than 200 msec and not greater than a speed of sound.

14. The solid electrolytic capacitor according to claim 13, wherein the first base electrode is a metal layer made of metal particles made of the non-valve metal colliding with the second edge surface of the package at a speed not smaller than 200 msec and not greater than a speed of sound.

15. A solid electrolytic capacitor comprising:
a first capacitor element including
a first positive electrode body made of valve metal,
a first dielectric oxide layer provided on a surface of the first positive electrode body,
a first solid electrolytic layer made of conductive polymer provided on the first dielectric oxide layer, and
a first negative electrode layer provided on the first solid electrolytic layer;
a package made of insulating resin covering the first capacitor element, the package having a first edge surface from which the first positive electrode body is exposed;
a first base electrode provided at the first edge surface of the package and made of non-valve metal coupled with the first positive electrode body;
a first diffusion layer for connecting the first positive electrode body to the first base electrode, the first diffusion layer being made of the valve metal of the first positive electrode body and the non-valve metal of the first base electrode;
a first external electrode provided on the first base electrode;
a second external electrode connected to the first negative electrode layer;
a second capacitor element including
a second positive electrode body made of the valve metal and exposed from a second edge surface of the package opposite to the first edge surface of the package,
a second dielectric oxide layer provided on a surface of the second positive electrode body,
a second solid electrolytic layer made of conductive polymer provided on the second dielectric oxide layer, and
a second negative electrode layer provided on the second solid electrolytic layer;
a second base electrode provided at the second edge surface of the package, the second base electrode being made of non-valve metal coupled to the second positive electrode body;
a second diffusion layer for connecting the second positive electrode body to the second base electrode, the second diffusion layer being made of the valve metal of the second positive electrode body and the non-valve metal of the second base electrode; and
a third external electrode provided on the second base electrode, wherein
the first capacitor element and the second capacitor element are stacked to form a stacked-element unit such that the first negative electrode layer contacts the second negative electrode layer,
the package covers the stacked-element unit such that the insulating resin fills a space between the first positive electrode body and the second positive electrode body,
the second external electrode includes a negative electrode conductor which is bonded to the first negative electrode layer of the first capacitor element and which is exposed from the package, and
the second base electrode is a metal layer made of metal particles made of the non-valve metal colliding with the second edge surface of the package at a speed not smaller than 200 msec and not greater than a speed of sound.

16. The solid electrolytic capacitor according to claim 15, wherein the first base electrode is a metal layer made of metal particles made of the non-valve metal colliding with the second edge surface of the package at a speed not smaller than 200 msec and not greater than a speed of sound.

* * * * *

UNITED STATES PATENT AND TRADEMARK OFFICE
CERTIFICATE OF CORRECTION

| | |
|---|---|
| PATENT NO. | : 8,064,192 B2 |
| APPLICATION NO. | : 12/663378 |
| DATED | : November 22, 2011 |
| INVENTOR(S) | : Kenji Kuranuki et al. |

It is certified that error appears in the above-identified patent and that said Letters Patent is hereby corrected as shown below:

In column 26, line 12 "msec" should be replaced with --m/sec--.

In column 27, line 2 "msec" should be replaced with --m/sec--.

In column 27, line 55 "msec" should be replaced with --m/sec--.

In column 27, line 61 "msec" should be replaced with --m/sec--.

In column 28, line 57 "msec" should be replaced with --m/sec--.

In column 28, line 63 "msec" should be replaced with --m/sec--.

Signed and Sealed this
Fifteenth Day of May, 2012

David J. Kappos
*Director of the United States Patent and Trademark Office*